United States Patent
Kaneko

(10) Patent No.: US 9,039,135 B2
(45) Date of Patent: May 26, 2015

(54) LIQUID ABSORBENT AND PRINTER

(71) Applicant: Seiko Epson Corporation, Tokyo (JP)

(72) Inventor: Ken Kaneko, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/960,918

(22) Filed: Aug. 7, 2013

(65) Prior Publication Data

US 2014/0055522 A1 Feb. 27, 2014

(30) Foreign Application Priority Data

Aug. 22, 2012 (JP) .................. 2012-183299
Aug. 22, 2012 (JP) .................. 2012-183300

(51) Int. Cl.
*B41J 2/165* (2006.01)
*B01J 20/26* (2006.01)
*C08L 1/02* (2006.01)

(52) U.S. Cl.
CPC ............ *B01J 20/262* (2013.01); *B41J 2/16523* (2013.01); *C08L 1/02* (2013.01); *C08L 2205/16* (2013.01)

(58) Field of Classification Search
USPC .......................................................... 347/31
See application file for complete search history.

(56) References Cited

U.S. PATENT DOCUMENTS

2008/0318025 A1   12/2008   Kurokawa et al.

FOREIGN PATENT DOCUMENTS

| JP | 62-001426 | | 1/1987 |
| JP | 3-056573 | | 3/1991 |
| JP | 3-79678 | | 4/1991 |
| JP | 3-160068 | | 7/1991 |
| JP | 4-18462 | | 1/1992 |
| JP | 08-311755 | | 11/1996 |
| JP | 3536870 | B2 | 6/2004 |
| JP | 2012-001851 | A | 1/2012 |
| JP | 2012001851 | A * | 1/2012 |

OTHER PUBLICATIONS

Partial European Search Report for Application No. EP 13 18 1333 dated Dec. 10, 2013 (5 pages).
Extended European Search Report for Application No. EP 13 18 1333 dated Jun. 13, 2014 (8 pages).

* cited by examiner

*Primary Examiner* — Jason Uhlenhake
(74) *Attorney, Agent, or Firm* — Harness, Dickey & Pierce, P.L.C.

(57) ABSTRACT

A liquid absorbent for ink contains a cellulose fiber, a heat-fusible material, and a flame-retardant material. The absorbent satisfies the relation $\sigma_1 - \sigma_0 \leq 500$, where $\sigma_0$ [$\mu$S/cm] is the electric conductivity of the ink and $\sigma_1$ [$\mu$S/cm] is that of a mixture of 5 g of the ink and 1 g of the flame-retardant material.

9 Claims, 11 Drawing Sheets

LIQUID ABSORBENT AND PRINTER

CROSS REFERENCES TO RELATED APPLICATIONS

This application claims the benefit of priority to Japanese Patent Application No. 2012-183300 filed Aug. 22, 2012 and No. 2012-183299 filed Aug. 22, 2012, the contents of which are hereby incorporated by reference in their entirety.

BACKGROUND

1. Technical Field

The present invention relates to a liquid absorbent and a printer.

2. Related Art

Ink jet printers usually generate waste ink while cleaning their print head to prevent the printing quality from being affected by clogging or while loading ink from a new cartridge. This type of printer thus has a liquid absorbent for such waste ink so as not to let the waste ink adhere to and damage the moving mechanisms and other components in the printer.

Ordinary liquid absorbents used for this purpose are composed of natural cellulose fiber and/or a synthetic fiber and a heat-fusible material and a flame-retardant material (e.g., refer to Japanese Patent No. 3536870).

However, such known liquid absorbents have disadvantages associated with insufficient permeation of ink and the failure to absorb waste ink sufficiently fast; for example, waste ink can adhere to components other than the liquid absorbent.

Furthermore, there is a demand for liquid absorbents for printers to be more flame-retardant to make printers even safer overall.

SUMMARY

An advantage of some aspects of the invention is that they provide a liquid absorbent that offers excellent ink permeation (ability to absorb ink) and excellent flame retardancy and a printer having a liquid absorbent that offers excellent ink permeation (ability to absorb ink) and excellent flame retardancy.

The following describes some aspects of the invention.

A liquid absorbent for ink according to an aspect of the invention contains: a cellulose fiber; a heat-fusible material; and a flame-retardant material. The absorbent satisfies the relation $\sigma_1 - \sigma_0 \leq 500$, where $\sigma_0$ [μS/cm] is the electric conductivity of the ink and $\sigma_1$ [μS/cm] is that of a mixture of 5 g of the ink and 1 g of the flame-retardant material.

A liquid absorbent for ink according to another aspect of the invention contains: a cellulose fiber; a heat-fusible material; and a flame-retardant material. In this aspect, the flame-retardant material is a powder having an average particle diameter of 10 μm or less.

These liquid absorbents offer excellent ink permeation (ability to absorb ink) and excellent flame retardancy.

Preferably, liquid absorbents according to these aspects of the invention are used to absorb a pigment ink in which pigment particles are dispersed.

Known liquid absorbents for ink, in particular, those for pigment inks in which pigment particles are dispersed, are disadvantageous in that they often fail to absorb the ink sufficiently fast. Liquid absorbents according to the aforementioned aspects of the invention do not have such disadvantages even when used with pigment inks. Indeed, the advantages of these aspects of the invention become more significant when the liquid absorbent is used to absorb a pigment ink.

It is also preferred that the flame-retardant material used in liquid absorbents according to these aspects of the invention contains one or two or more selected from the group consisting of melamine polyphosphate, ammonium phosphate, aluminum hydroxide, and phosphazenes.

This significantly enhances the ink permeation (ability to absorb ink) and flame retardancy of the liquid absorbent.

The cellulose fiber used in liquid absorbents according to these aspects of the invention preferably contains a cellulose fiber recycled from waste paper.

The use of recycled material contributes to resource and energy saving and is also environmentally friendly.

The heat-fusible material used in liquid absorbents according to these aspects of the invention preferably contains one or two or more selected from the group consisting of polyesters, polyolefins, polyamides, and polyurethanes.

This makes the liquid absorbent highly stable in shape and highly formable while enhancing the ink permeation (ability to absorb ink) and flame retardancy of the absorbent.

In liquid absorbents according to these aspects of the invention the flame-retardant material preferably constitutes 5% by mass to 30% by mass, both inclusive, of the absorbent.

This significantly enhances the ink permeation (ability to absorb ink) and flame retardancy of the liquid absorbent while making the absorbent more stable in shape and more formable.

In liquid absorbents according to these aspects of the invention the cellulose fiber preferably constitutes 30% by mass to 90% by mass, both inclusive, of the absorbent.

This also significantly enhances the ink permeation (ability to absorb ink) and flame retardancy of the liquid absorbent while making the absorbent more stable in shape and more formable.

In liquid absorbents according to these aspects of the invention the heat-fusible material preferably constitutes 5% by mass to 40% by mass, both inclusive, of the absorbent.

Liquid absorbents according to these aspects of the invention are preferably formed by compressing a substance containing the cellulose fiber, the heat-fusible material, and the flame-retardant material at a temperature of 100° C. to 250° C., both inclusive, with a pressure of 1000 Pa to 8000 Pa, both inclusive, and for a duration of 30 seconds to 120 seconds, both inclusive.

This makes the liquid absorbent highly stable in shape and highly formable while enhancing the ink permeation (ability to absorb ink) and flame retardancy of the absorbent.

A printer according to yet another aspect of the invention has a liquid absorbent according to one aspect of the invention.

This allows the printer to have a liquid absorbent offering excellent ink permeation (ability to absorb ink) and excellent flame retardancy.

BRIEF DESCRIPTION OF THE DRAWINGS

The invention will be described with reference to the accompanying drawings, wherein like numbers reference like elements.

FIG. 7A illustrates the valve in the closed position. In FIG. 7B, the valve has been opened because of the introduction of waste ink and the subsequent increase in pressure in the reservoir space. FIG. 7C illustrates the valve returned to the closed position after the introduction of waste ink.

DESCRIPTION OF EXEMPLARY EMBODIMENTS

Figure 1:
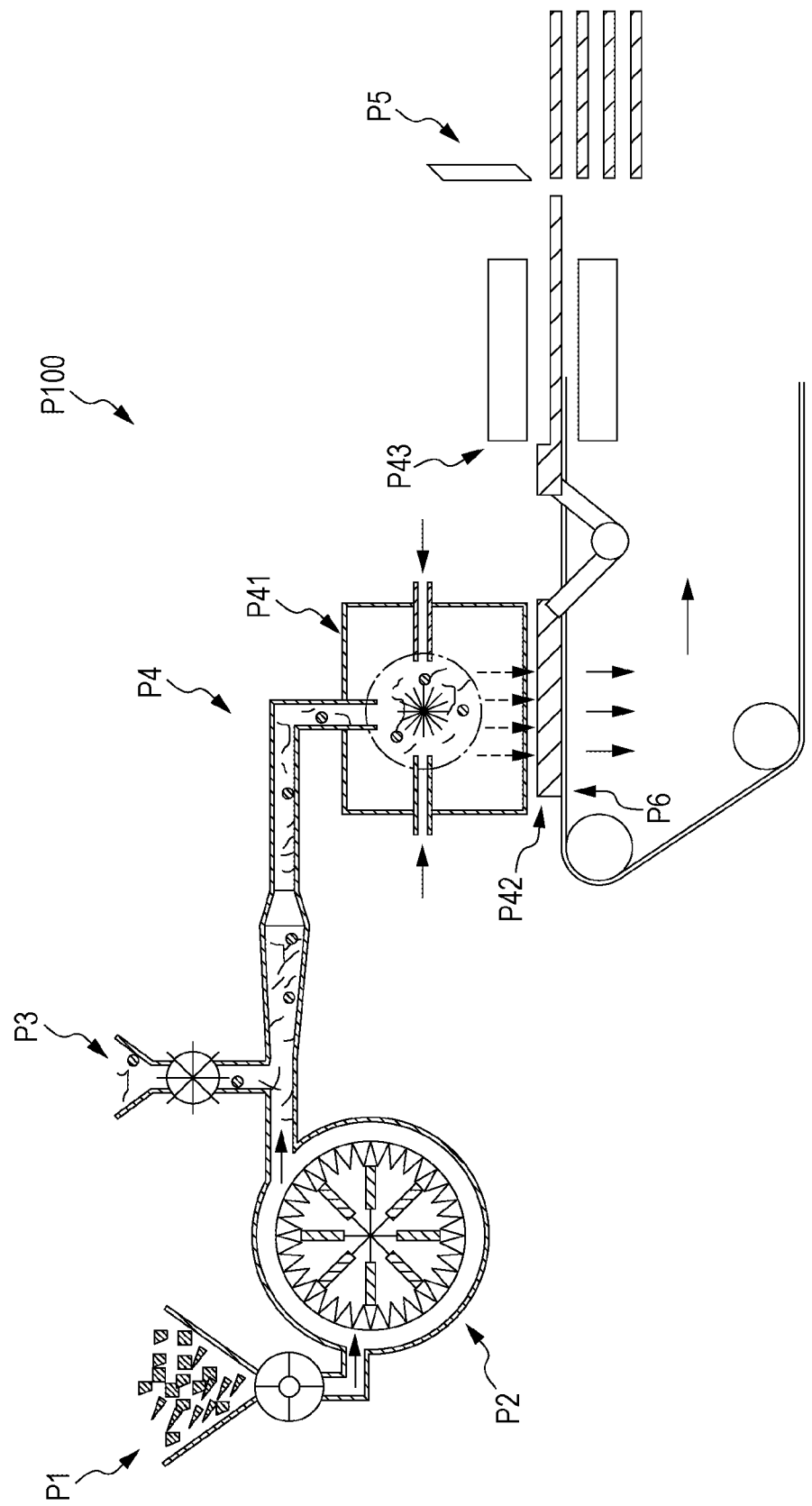
FIG. 1 is a schematic diagram illustrating the constitution of a preferred embodiment of a system that can be used to produce a liquid absorbent according to an embodiment of the invention.

The following describes some preferred embodiments of the invention in detail.

Liquid Absorbent

The following paragraphs outline liquid absorbents according to some embodiments of the invention.

Ordinary liquid absorbents used with printers are composed of natural cellulose fiber and/or a synthetic fiber and a heat-fusible material and a flame-retardant material.

However, such known liquid absorbents have disadvantages associated with insufficient permeation of ink and the failure to absorb waste ink sufficiently fast; for example, waste ink can adhere to components other than the liquid absorbent.

Furthermore, there is a demand for liquid absorbents for printers to be more flame-retardant to make printers even safer overall.

Under these circumstances, the inventors conducted extensive research to find a liquid absorbent that would offer excellent ink permeation (ability to absorb ink) and excellent flame retardancy and finally reached this invention.

A liquid absorbent for ink according to an embodiment of the invention contains a cellulose fiber, a heat-fusible material, and a flame-retardant material. The absorbent satisfies the relation $\sigma_1 - \sigma_0 \leq 500$, where $\sigma_0$ [µS/cm] is the electric conductivity of the ink and $\sigma_1$ [µS/cm] is that of a mixture of 5 g of the ink and 1 g of the flame-retardant material. Configured in this way, the liquid absorbent offers excellent ink permeation (ability to absorb ink) and excellent flame retardancy.

The term electric conductivity, as used herein, refers to an electric conductivity measured at room temperature (25° C.) unless otherwise specified. The electric conductivity $\sigma_1$ is the value determined by analysis of a mixture of 5 parts by mass of the ink and 1 part by mass of the flame-retardant material in a sealable container with a lid after 5 minutes of stirring with a stirrer (a magnetic stirrer at 500 rpm) and 2 hours of incubation at room temperature (25° C.). An example of an instrument that can be used to measure the electric conductivity is HORIBA ES-51.

A liquid absorbent for ink according to another embodiment of the invention contains a cellulose fiber, a heat-fusible material, and a flame-retardant material. In this embodiment, the flame-retardant material is in the form of a powder having an average particle diameter of 10 µm or less. The liquid absorbent, configured in this way, also offers excellent ink permeation (ability to absorb ink) and excellent flame retardancy. The term average particle diameter, as used herein, refers to a volume-weighted average particle diameter. An example of an instrument that can be used to measure the average particle diameter is HORIBA LA-910.

An example of the ink is a mixture of a black ink, a yellow ink, a magenta ink, and a cyan ink in equal amounts (equal weights), all four inks detailed below. The black ink contains, in percent by mass, 5% self-dispersing carbon black (Orient Chemical Industries CW-1; volume-weighted average particle diameter, 150 nm), 3% resin emulsion (styrene-acrylic acid), 0.5% acetylenic surfactant (OLFINE E1010), 5% glycerol, 2% 2-pyrrolidone, and 2% 1,2-hexanediol, with the balance being water. The yellow ink contains, in percent by mass, 3% resin-coated Pigment Yellow 74 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The magenta ink contains, in percent by mass, 3% resin-coated Pigment Red 122 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The cyan ink contains, in percent by mass, 3% resin-coated Pigment Blue 15:3 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water.

An example of the resin for coating Pigment Yellow 74, Pigment Red 122, and Pigment Blue 15:3 is a water-insoluble polymer synthesized in the following way. A reactor is loaded with 20 parts of an organic solvent (methyl ethyl ketone), 0.03 part of a chain-transfer agent (2-mercaptoethanol), 1.2 parts of a polymerization initiator (2,2'-azobis(2,4-dimethylvaleronitrile)), 20 parts of methacrylic acid, 45 parts of styrene monomer, 5 parts of polyethylene glycol monomethacrylate (9 POs), 10 parts of polyethylene glycol-propylene glycol monomethacrylate (5 EOs and 7 POs), and 20 parts of styrene macromonomer (TOAGOSEI AS-6S; number-average molecular weight, 6000; polymerizable functional group, methacryloyloxy), all in parts by mass. After the reactor is completely filled with a nitrogen gas, the monomers are polymerized at 75° C. under stirring. A solution of 0.9 part by mass of 2,2'-azobis(2,4-dimethylvaleronitrile) in 40 parts by mass of methyl ethyl ketone, both relative to 100 parts by mass of the polymerizable components, is added, and the mixture is incubated at 80° C. for 1 hour. The resulting water-insoluble polymer solution is dried under reduced pressure, leaving the water-insoluble polymer. (The terms POs and EOs denote propylene oxide units and ethylene oxide units, respectively.)

A typical process for coating the base pigment particles (Pigment Yellow 74, Pigment Red 122, and Pigment Blue 15:3) with the water-insoluble polymer is as follows. Five (5) parts by mass of the water-insoluble polymer is dissolved in 15 parts by mass of methyl ethyl ketone. The polymer is neutralized using an aqueous solution of sodium hydroxide, 15 parts by mass of the base pigment is added, and the mixture is kneaded in a dispersing machine while water is added. After the resulting compound is combined with 100 parts by mass of ion-exchanged water while stirring, methyl ethyl ketone and some amount of water are removed at 60° C. under reduced pressure. An aqueous dispersion of the colorant coated with the water-insoluble polymer (solid content, 20% by mass) is obtained in this way.

A typical process for obtaining the resin emulsion (styrene-acrylic acid) is as follows. A reactor having a stirrer, a reflux condenser, a dripping device, and a thermometer is loaded with 800 g of ion-exchanged water and 1 g of sodium lauryl sulfate, and the reactor is heated to 75° C. under stirring while nitrogen is introduced. Six (6) grams of potassium persulfate, a polymerization initiator, is added and dissolved with the internal temperature maintained at 75° C. An emulsion is prepared beforehand by combining 450 g of ion-exchanged water and 2 g of sodium lauryl sulfate with 20 g of acrylamide, 600 g of methyl methacrylate, 215 g of butyl acrylate, 30 g of methacrylic acid, and 5 g of triethylene glycol diacrylate under stirring, and this emulsion is continuously added dropwise to the reaction solution over 5 hours. The obtained mixture is incubated for 3 hours. After the resulting aqueous emulsion has cooled to room temperature, ion-exchanged water and sodium hydroxide solution are added until the solid content is 30% by mass and the pH is 8. The resin emulsion (styrene-acrylic acid) is obtained in this way.

Liquid absorbents according to these embodiments of the invention may be of any kind that is used to absorb ink, including ones for absorbing inks in which a dye is dissolved. Preferably, these liquid absorbents are used to absorb a pigment ink in which pigment particles are dispersed. Known liquid absorbents for ink, in particular, those for pigment inks in which pigment particles are dispersed, are disadvantageous in that they often fail to absorb the ink sufficiently fast. Liquid absorbents according to these embodiments of the invention do not have such disadvantages even when used with pigment inks. Indeed, the advantages of these embodiments of the invention become more significant when the liquid absorbent is used to absorb a pigment ink.

Cellulose Fiber

In general, cellulose fiber is the main component of liquid absorbents for ink and greatly contributes to the overall ability of the absorbents to absorb ink (liquid absorbability).

Cellulose fiber has favorable physical properties such as adequate hardness. When used in a liquid absorbent for ink, cellulose fiber effectively prevents problems such as splashes of the ink discharged toward the absorbent.

Examples of cellulose fibers that can be used in liquid absorbents according to these embodiments of the invention include papermaking wood pulp such as those produced from softwood and/or hardwood by chemical or mechanical means as well as waste paper pulp, linters, and non-wood plant fibers produced from plants such as hemp, cotton, and kenaf.

The cellulose fiber is supplied in the form of a dried pulp sheet, for example. This pulp sheet is mechanically refined by a dry process. If necessary, the refined fiber can be mixed with other synthetic fibers, including olefin fibers made of polyolefins such as polyethylene and polypropylene as well as polyesters.

The term cellulose fiber, as used herein, includes all kinds of fibers mainly composed of the compound cellulose (cellulose in a narrower sense); this term therefore refers to, besides cellulose (in the narrower sense), hemicellulose, lignin, and so forth.

The cellulose fiber used in liquid absorbents according to these embodiments of the invention may contain one recycled from waste paper. The use of recycled material contributes to resource and energy saving and is also environmentally friendly.

When a cellulose fiber recycled from waste paper is used, the percentage thereof to the total cellulose fiber content of the liquid absorbent is preferably in the range of 50% by mass to 100% by mass, both inclusive, more preferably 80% by mass to 100% by mass, both inclusive. This allows the expected benefit, described above, of using the recycled cellulose fiber to be fully achieved without affecting the excellent overall ability of the liquid absorbent to absorb ink.

The cellulose fiber preferably constitutes 30% by mass to 90% by mass, both inclusive, more preferably 65% by mass to 85% by mass, both inclusive, of the liquid absorbent. This significantly enhances the ink permeation (ability to absorb ink) and flame retardancy of the absorbent while making the absorbent more stable in shape and more formable.

Heat-Fusible Material

Liquid absorbents according to these embodiments of the invention contain a heat-fusible material.

The heat-fusible material is able to join and hold together the other ingredients of the liquid absorbent by fusion. With this ability the heat-fusible material makes the liquid absorbent more stable in shape and easy to work into the desired shape and size. The heat-fusible material also effectively prevents problems such as filaments of the cellulose fiber flying off of the liquid absorbent and thus, when the liquid absorbent is used with a printer, is effective in protecting the printer from being contaminated from the inside, for example.

Examples of heat-fusible substances that can be used include resins. Preferably, the heat-fusible material contains one or two or more selected from the group consisting of olefin polymers (e.g., polyethylene, polypropylene, polyvinyl acetate, ethylene-vinyl acetate copolymers, and polyvinyl alcohol [PVA]), polyamides, polyesters, and polyurethanes. This makes the liquid absorbent highly stable in shape and highly formable while enhancing the ink permeation (ability to absorb ink) and flame retardancy of the absorbent.

It is possible that different heat-fusible substances are used from which different sections of a structure are made, for example. A more specific example is a structure that has a base (a core) made of a high-melting point substance (e.g., a polypropylene with a melting point of, for example, 160° C.) and a coating layer made of a low-melting point substance (e.g., a polyethylene with a melting point of, for example, 130° C.). An advantage of such a structure is that during the production of the liquid absorbent the outside of the structure, i.e., the coating layer, can be selectively melted (or softened) by heating at a temperature at which the coating layer is melted (or softened) but the base is not. This significantly improves the ease of production of the liquid absorbent and also makes the liquid absorbent highly stable in shape.

The heat-fusible material may be in any form. Examples of the forms the heat-fusible material can take in these liquid absorbents include powder, needles, fiber, and an amorphous substance. It is also possible to use a mixture of two or more forms of the heat-fusible material.

When the heat-fusible material is a powder, the average particle diameter is preferably in the range of 50 μm to 500 μm, both inclusive.

When the heat-fusible material is in the form of fiber, the fineness is preferably in the range of 0.1 dtex to 72 dtex, both inclusive, and the staple length is preferably in the range of 1 mm to 10 mm, both inclusive.

The heat-fusible material preferably constitutes 5% by mass to 40% by mass, both inclusive, more preferably 12% by mass to 20% by mass, both inclusive, of the liquid absorbent. This makes the liquid absorbent highly stable in shape and highly formable while enhancing the ink permeation (ability to absorb ink) and flame retardancy of the absorbent.

Flame-Retardant Material

Liquid absorbents according to these embodiments of the invention contain a flame-retardant material.

The flame-retardant material is highly nonflammable in itself and can improve the overall flame retardancy of the liquid absorbent.

In one embodiment of the invention, the flame-retardant material used in the liquid absorbent for ink satisfies the relation $\sigma_1-\sigma_0 \leq 500$, where $\sigma_0$ [µS/cm] is the electric conductivity of the ink and $\sigma_1$ [µS/cm] is that of a mixture of 5 g of the ink and 1 g of the flame-retardant material. The liquid absorbent can combine excellent overall ink permeation (ability to absorb ink) and excellent overall flame retardancy when this requirement is met.

Although this embodiment of the invention requires that the relation $\sigma_1-\sigma_0 \leq 500$ be satisfied, it is preferred that the relation $\sigma_1-\sigma_0 \leq 300$, more preferably $\sigma_1-\sigma_0 \leq 200$, even more preferably $\sigma_1-\sigma_0 \leq 180$ is satisfied. This makes the aforementioned advantage more significant.

In another embodiment of the invention, the flame-retardant material used in the liquid absorbent for ink is a powder having an average particle diameter of 10 µm or less. This also ensures that the liquid absorbent can combine excellent overall ink permeation (ability to absorb ink) and excellent overall flame retardancy.

Although this embodiment of the invention requires that the flame-retardant material used in the liquid absorbent be a powder and its average particle diameter be 10 µm or less, it is preferred that the average particle diameter is in the range of 0.1 µm to 10 µm, both inclusive, more preferably 1 µm to 5 µm, both inclusive. This makes the aforementioned advantage more significant.

Examples of flame-retardant substances that can be used include the following: hydrated metal salts such as aluminum hydroxide, aluminum carbonate, magnesium hydroxide, magnesium carbonate, huntite, hydromagnetsite, calcium hydroxide, calcium carbonate, zinc sulfate, dihydrate gypsum, calcium aluminate, dawsonite, and kaolin clay; phosphates containing amino and/or ammonium groups such as ammonium polyphosphate (APP), guanidine phosphate, melamine polyphosphate, and guanylurea phosphate; nitrogen phosphorus flame retardants obtained by adding a compound containing amino and/or ammonium groups to such phosphates; phosphazenes; borates such as $Na_2B_4O_7 \cdot 10H_2O$; and cross-linked sodium polyacrylate and other superabsorbent polymers (e.g., Aqualic [Nippon Shokubai], Daiya Wet [Mitsubishi Chemical], Aronzap [TOAGOSEI], Aquareserve GP [The Nippon Synthetic Chemical Industry], Sumikagel [Sumitomo Chemical], Sanwet [Sanyo Chemical Industries], Arasorb [Arakawa Chemical Industries], Drytech [Dow Chemical], Favor [Stockhausen], Bell Oasis [Kanebo], and Fibersorb [Camelot]). Preferably, the flame-retardant material contains one or two or more selected from the group consisting of melamine polyphosphate, ammonium phosphate, aluminum hydroxide, and phosphazenes, more preferably selected from phosphates. This significantly enhances the ink permeation (ability to absorb ink) and flame retardancy of the liquid absorbent. It is possible to use different flame-retardant substances from which different sections of a structure are made, for example.

The average particle diameter of the flame-retardant material is preferably in the range of 0.1 µm to 20 µm, both inclusive, more preferably 1 µm to 10 µm, both inclusive. This also significantly enhances the ink permeation (ability to absorb ink) and flame retardancy of the liquid absorbent. The term average particle diameter, as used herein, refers to a volume-weighted average particle diameter. An example of an instrument that can be used to measure the average particle diameter is HORIBA LA-910.

The flame-retardant material preferably constitutes 5% by mass to 30% by mass, both inclusive, more preferably 8% by mass to 15% by mass, both inclusive, of the liquid absorbent. This significantly enhances the ink permeation (ability to absorb ink) and flame retardancy of the liquid absorbent while making the absorbent more stable in shape and more formable.

Additives

Liquid absorbents according to these embodiments of the invention may also contain additives. Examples of such nonessential ingredients (additives) include surfactants, antifoams, humectants, preservatives, pH-adjusting agents, and antistatic agents.

Process for Producing the Liquid Absorbent

The following paragraphs describe a process for producing a liquid absorbent according to an embodiment of the invention.

FIG. 1 is a schematic diagram illustrating the constitution of a preferred embodiment of a system that can be used to produce a liquid absorbent according to an embodiment of the invention. Note that all drawings referenced herein are magnified views illustrating some selected elements and the relative dimensions and other features of the elements are not identical to the reality.

A production system P100 illustrated in FIG. 1 has a cellulose fiber feeding unit P1 for feeding waste paper as cellulose fiber source, a refining unit P2 for refining the waste paper, a feeding unit P3 for feeding a mixture containing the heat-fusible material and the flame-retardant material (hereinafter referred to as the mixture feeding unit), a forming unit P4 for forming the mixture containing the cellulose fiber, the heat-fusible material, and the flame-retardant material into a predetermined shape, and a cutting unit P5 for cutting the article produced at the forming unit P4.

The cellulose fiber feeding unit P1 has a weighing feeder for weighing the waste paper and supplying it to the refining unit P2.

The refining unit P2 refines the waste paper, i.e., the cellulose fiber source, into filaments of a predetermined size.

The mixture feeding unit P3 also has a weighing feeder. This feeder weighs the mixture containing the heat-fusible and flame-retardant materials and supplies the mixture to the next unit, thereby ensuring an appropriate proportion of the heat-fusible and flame-retardant materials to the cellulose fiber.

The forming unit P4 has a mixing section P41 for stirring the supplied mixture until the cellulose fiber, the heat-fusible material, are the flame-retardant material are uniformly mixed, a forming section P42 for forming the mixture into a sheet, and a fixing section P43 at which the sheet is heated and compressed until the heat-fusible material is melted (or softened) at least in part and holds the other ingredients together.

At the mixing section P41 a stirring gas is introduced and used to mix the ingredients. This helps the ingredients to be mixed more uniformly in an efficient manner.

At the forming section P42 the mixture placed on a breathable transporting unit P6 is sucked onto the transporting unit P6. This process brings the mixture into close contact with the transporting unit P6 and forms the mixture into a sheet.

At the fixing section P43 the sheet is heated and compressed under predetermined conditions until the heat-fusible material is melted (or softened) at least in part and holds the other ingredients together. This gives the resulting article excellent stability in shape.

Preferred conditions of this pressing process at the fixing section P43 include a temperature of 100° C. to 250° C., both inclusive, a pressure of 1000 Pa to 8000 Pa, both inclusive, and a duration of 30 seconds to 120 seconds, both inclusive. A pressing process satisfying such conditions significantly enhances the ink permeation (ability to absorb ink) and flame retardancy of the resulting liquid absorbent.

Although it is preferred that the temperature for the compression process at the fixing section P43 is in the range of 100° C. to 250° C., both inclusive, the compression temperature is more preferably in the range of 190° C. to 240° C., both inclusive, even more preferably 200° C. to 230° C., both inclusive. This makes the aforementioned advantage more significant.

Likewise, the pressure for the compression process at the fixing section P43, which is preferably in the range of 1000 Pa to 8000 Pa, is more preferably in the range of 3000 Pa to 6000 Pa, both inclusive, even more preferably 4000 Pa to 5000 Pa, both inclusive. This is also effective in making the aforementioned advantage more significant.

The duration of the compression process at the fixing section P43, which is preferably in the range of 30 seconds to 120 seconds, is more preferably in the range of 40 seconds to 110 seconds, both inclusive, even more preferably 50 seconds to 100 seconds, both inclusive. This also contributes to making the aforementioned advantage more significant.

Ink

Examples of inks that can be absorbed using absorbents according to these embodiments of the invention include ones containing colorants.

The colorant in the ink can be a water-soluble dye, a disperse dye, or a water-insoluble pigment, for example. Liquid absorbents according to these embodiments of the invention are effective especially when used with inks containing water-insoluble colorants.

Examples of preferred pigments include carbon blacks. Specific examples include products available from Mitsubishi Chemical such as #2300, #900, HCF88, #33, #40, #45, #52, MA7, MA8, MA100, and #2200B. It is also possible to use a mixture of two or more such pigments.

The term self-dispersing pigment, herein used to describe carbon blacks, refers to a pigment surface-modified with many hydrophilic functional groups and/or their salts, directly or with groups such as alkyl, alkyl ether, or aryl therebetween, so that the pigment can be dispersed and/or dissolved in an aqueous medium without dispersants. The expression dispersed and/or dissolved in an aqueous medium without dispersants means that in the aqueous medium the pigment is stable having the smallest particle diameter in a dispersed state. The term smallest particle diameter in a dispersed state denotes the smallest particle diameter of the pigment reachable by prolonged dispersion.

A typical process for producing a self-dispersing pigment is to treat a pigment by physical or chemical means to bond (graft) a functional group that imparts dispersibility (e.g., —COOH, —CO, —OH, —SO$_3$H, —PO$_3$H$_2$, or quaternary ammonium or its salt) or an active species having such a functional group to the surface of the pigment. Examples of physical means that can be used include vacuum plasma treatment, and examples of chemical means that can be used include wet oxidation, i.e., oxidizing the surface of the pigment in water by using an oxidizing agent, and bonding p-aminobenzoic acid to the surface of the pigment to attach the carboxyl group via the phenyl group.

Commercially available self-dispersion pigments can also be used. Examples include MICROJET CW-1 (Orient Chemical Industries) and CAB-O-JET 200 and CAB-O-JET 300 (Cabot Corporation).

The volume-weighted average particle diameter of the pigment is preferably in the range of 50 nm to 250 nm, both inclusive. The volume-weighted average particle diameter of particles can be obtained by particle size measurement using Microtrac UPA 150 (Microtrac) or LPA-3100 particle size analyzer (Otsuka Electronics), for example.

Examples of pigments for colored inks include those listed in the Color Index, such as Pigment Yellow, Pigment Red, Pigment Violet, and Pigment Blue. Specific examples include the following: C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 147, 150, 153, 155, 174, 180, 188, and 198; C.I. Pigment Red 1, 3, 5, 8, 9, 16, 17, 19, 22, 38, 57:1, 90, 112, 122, 123, 127, 146, 184, 202, 207, and 209; C.I. Pigment Violet 1, 3, 5:1, 16, 19, 23, 38; C.I. Pigment Blue 1, 2, 15, 15:1, 15:2, 15:3, 15:4, and 16; and C.I. Pigment Black 1 and 7. Inks containing two or more pigments can also be used.

A typical process for producing a self-dispersing pigment for colored inks is to bond a hydrophilic group to the surface of a pigment via the phenyl group. The hydrophilic functional group or its salt can be attached to the surface of the pigment via the phenyl group by a variety of known surface treatment methods. For example, bonding a compound such as sulfanic acid, p-aminobenzoic acid, or 4-aminosalicylic acid to the surface of the pigment results in the hydrophilic group being attached via the phenyl group.

Commercially available self-dispersing pigments for colored inks can also be used. Examples include CAB-O-JET 250C, CAB-O-JET 260M, and CAB-O-JET 270Y (Cabot Corporation).

Examples of dyes that can be used include water-soluble dyes and disperse dyes. It is possible to use different dyes in combination if necessary. Typical examples of water-soluble dyes include direct dyes, acid dyes, basic dyes, and reactive dyes. Preferred structures of water-soluble dyes include azo compounds, metal complex salts, naphthol, anthraquinone, indigo, carbonium, quinonimines, xanthene, aniline, quinoline, nitro compounds, nitroso compounds, benzoquinone, naphthoquinone, phthalocyanine, and metallophthalocyanines. The following lists some examples of water-soluble dyes preferred for use in inks for ink jet recording and satisfying performance requirements such as brightness, water-solubility, stability, and light fastness: direct dyes such as C.I. Direct Yellow 12, 24, 26, 27, 28, 33, 39, 58, 86, 98, 100, 132, and 142, C.I. Direct Red 4, 17, 28, 37, 63, 75, 79, 80, 81, 83, and 254, C.I. Direct Violet 47, 48, 51, 90, and 94, C.I. Direct Blue 1, 6, 8, 15, 22, 25, 71, 76, 80, 86, 87, 90, 106, 108, 123, 163, 165, 199, and 226, and C.I. Direct Green 1, 26, 28, 59, 80, and 85; acid dyes such as C.I. Acid Yellow 3, 11, 17, 19, 23, 25, 29, 38, 42, 49, 59, 61, 71, and 72, C.I. Acid Red 1, 6, 8, 18, 32, 35, 37, 42, 52, 85, 88, 115, 133, 134, 154, 186, 249, 289, and 407, C.I. Acid Violet 10, 34, 49, and 75, C.I. Acid Blue 9, 22, 29, 40, 59, 62, 93, 102, 104, 112, 113, 117, 120, 167, 175, 183, 229, and 234, and C.I. Acid Green 3, 5, 9, 12, 15, 16, 19, 25, 27, 28, 36, 40, 41, 43, 44, 56, 73, 81, 84, 104, 108, and 109; basic dyes such as C.I. Basic Yellow 40, C.I. Basic Red 9, 12, and 13, C.I. Basic Violet 7, 14, and 27, C.I. Basic Blue 1, 3, 5, 7, 9, 24, 25, 26, 28, and 29, and C.I. Basic Green 1 and 4; and reactive dyes such as C.I. Reactive Yellow 2, C.I. Reactive Red 4, 23, 24, 31, and 56, C.I. Reactive Blue 7, 13, and 49, and C.I. Reactive Green 5, 6, 7, 8, 12, 15, 19, and 21.

Examples of disperse dyes that can be used include the following: direct dyes such as C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, and 122, C.I. Disperse Orange 1, 3, 5, 7, 11, 13, 17, 20, 21, 25, 29, 30, 31, 32, 33, 37, 38, 42, 48, 49, 50, 53, 54, 55, 56, 57, 73, 76, 78, 80, 89, 90, 91, 93, 96, 97, 119, 127, 130, 139, and 142, C.I. Disperse Red 1, 4, 5, 7, 11, 12, 13, 15, 17, 27, 43, 44, 50, 52, 59, 60, 65, 72, 73, 74, 75, 76, 78, 81, 90, 91, 92, 93, 96, 103, 105, 225, 227, 229, 239, 240, 257, 258, 277, 278, 279, 281, 288, 298, 302, 303, 310, 311, 312, 320, 324, and 328, C.I. Disperse Violet 1, 4, 8, 23, 26, 27, 28, 31, 33, 35, 36, 38, 40, 43, 46, 48, 50, 51, 52, 56, 57, 59, 61, 63, 69, and 77, C.I. Disperse Green 9, C.I. Disperse Brown 1, 2, 4, 9, 13, and 19, C.I. Disperse Blue 3, 7, 9, 14, 16, 19, 20, 26, 27, 35, 43, 44, 54, 55, 56, 58, 60, 62, 64, 108, 112, 113, 115, 118, 120, 122, 125, 128, 130, 139, 141, 142, 143, 146, 148, 176, 181, 183, 185, 186, 187, 189, 207, 288, 291, 293, 295, 297, 301, 315, 330, and 333, and C.I. Direct Black 17, 19, 32, 51, 71, 108, 146, 154, and 168; acid dyes such as C.I. Acid Black 2, 7, 24, 26, 31, 52, 63, 112, and 118; basic dyes such as C.I. Basic Black 2; and food dyes C.I. Food Black 1 and 2.

The ink may also contain ingredients other than the colorant such as resin emulsion, a water-insoluble polymer, and a water-soluble organic solvent.

The resin contained in the resin emulsion is preferably selected from the group consisting of acrylic resins, methacrylic resins, vinyl acetate resins, vinyl chloride resins, and styrene-acrylic resins. It is also possible to use two or more such resins. The resin may be a homopolymer or a copolymer, and its structure may be monophase or multiphase (the core-shell structure). Emulsions containing fine particles of resin (e.g., acrylic emulsions) can be obtained by known emulsion polymerization processes, such as emulsion polymerization of an unsaturated monomer (e.g., an unsaturated vinyl monomer) in water containing a polymerization initiator and a surfactant.

Known resin emulsions can also be used. For example, the resin emulsions disclosed in publications such as JP-B-62-1426, JP-A-3-56573, JP-A-3-79678, JP-A-3-160068, and JP-A-4-18462 can be directly used.

Commercially available resin emulsions can also be used. Examples include MICROGEL E-1002 and E-5002 (styrene-acrylic resin emulsions, Nippon Paint), VONCOAT 4001 (acrylic resin emulsion, Dainippon Ink and Chemicals) and VONCOAT 5454 (styrene-acrylic resin emulsion, Dainippon Ink and Chemicals), SAE-1014 (styrene-acrylic resin emulsion, Zeon Corporation), and SAIVINOL SK-200 (acrylic resin emulsion, Saiden Chemical Industry).

The water-insoluble polymer is suitable for use as coatings for the colorant in the ink. The term water-insoluble polymer, as used herein, refers to a polymer obtained by solution polymerization using at least a polymerizable unsaturated monomer and a polymerization initiator and soluble in water at a rate of less than 1 g per 100 g of water at 25° C. after neutralization. The coating water-insoluble polymer preferably has a weight-average molecular weight on the order of 10,000 to 150,000 as this allows the colorant to be stable in a dispersed state particularly when the colorant is a pigment. The weight-average molecular weight of water-insoluble polymers can be measured by molecular weight analysis using gel permeation chromatography (GPC). For better color reproduction and a brighter shine on glossy media it is preferred that the average particle diameter of the coating polymer in the ink is in the range of 50 nm to 250 nm, both inclusive, more preferably 50 nm to 150 nm, both inclusive.

The average particle diameter of water-insoluble polymers can be obtained by particle size measurement using Microtrac UPA 150 (Microtrac) or LPA-3100 particle size analyzer (Otsuka Electronics), for example.

Examples of water-soluble organic solvents that can be added to the ink include the following: polyvalent alcohols such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, 1,5-pentanediol, and 4-methyl-1,2-pentanediol; saccharides such as glucose, mannose, fructose, ribose, xylose, arabinose, galactose, aldonic acid, glucitol (sorbitol), maltose, cellobiose, lactose, sucrose, trehalose, and maltotriose; sugar alcohols; hyaluronic acid and its derivatives; "solid moisturizers" such as trimethylolethane, trimethylolpropane, urea, and urea derivatives (e.g., dimethylurea); alkyl alcohols of 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-t-butyl ether, triethylene glycol monobutyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, dipropylene glycol monomethyl ether, dipropylene glycol monoethyl ether, dipropylene glycol mono-n-propyl ether, and dipropylene glycol monoisopropyl ether; 2-pyrrolidone and N-methyl-2-pyrrolidone; 1,3-dimethyl-2-imidazolidinone; formamide and acetamide; dimethylsulfoxide; sorbitol and sorbitan; acetin, diacetin, and triacetin; and sulfolane. It is also possible to use two or more such water-soluble organic solvents. Preferably, the ink contains the water-soluble organic solvent in an amount of 5% by weight to 50% by weight, both inclusive, as this ensures adequate physical properties of the ink (e.g., viscosity) and the quality and reliability of printed material.

The ink may contain a surfactant. Examples of surfactants that can be used include anionic surfactants, cationic surfactants, amphoteric surfactants, and nonionic surfactants. Nonionic surfactants are particularly preferred because this type of surfactant ensures that the resulting ink will be unlikely to foam.

Specific examples of nonionic surfactants that can be used include the following: surfactants based on acetylenic glycol or acetylenic alcohols; ethers such as polyoxyethylene nonylphenyl ether, polyoxyethylene octylphenyl ether, polyoxyethylene dodecylphenyl ether, polyoxyethylene alkyl allyl ethers, polyoxyethylene oleyl ether, polyoxyethylene lauryl ether, polyoxyethylene alkyl ethers, and polyoxyalkylene alkyl ethers; esters such as polyoxyethylene oleate, polyoxyethylene oleic acid ester, polyoxyethylene distearate, sorbitan laurate, sorbitan monostearate, sorbitan monooleate, sorbitan sesquioleate, polyoxyethylene monooleate, and polyoxyethylene stearate; surfactants based on polyether-modified siloxanes such as dimethyl polysiloxane; and fluorinated surfactants such as fluorinated alkyl esters and perfluoroalkyl carboxylates. Combinations of two or more nonionic surfactants can also be used.

Surfactants based on acetylenic glycol or polyether-modified siloxanes are low-foaming and are excellent antifoams compared to other nonionic surfactants. Thus, it is preferred to use either or both of these types of surfactants.

Specific examples of acetylenic glycol surfactants include 2,4,7,9-tetramethyl-5-decyn-4,7-diol, 3,6-dimethyl-4-octyn-3,6-diol, and 3,5-dimethyl-1-hexyn-3-ol. There are also commercially available acetylenic glycol surfactants, such as Air Products SURFYNOL 104, 82, 465, 485, and TG as well as Nissin Chemical Industry OLFINE STG and OLFINE E1010. Specific examples of polyether-modified siloxane surfactants include BYK Japan BYK-345, BYK-346, BYK-347, BYK-348, and UV3530. It is also possible that the ink contains two or more such surfactants. The surfactant content of the ink is in the range of 0.1% by mass to 3.0% by mass, both inclusive, and the ink preferably has a surface tension of 20 mN/m to 40 mN/m, both inclusive.

Printer

The following paragraphs outline a printer according to yet another embodiment of the invention.

A printer according to an embodiment of the invention has a liquid absorbent according to one embodiment of the invention. This allows the printer to have a liquid absorbent offering excellent ink permeation (ability to absorb ink) and excellent flame retardancy.

The following describes a preferred embodiment of printers according to one aspect of the invention with reference to the accompanying drawings.

Figure 2:
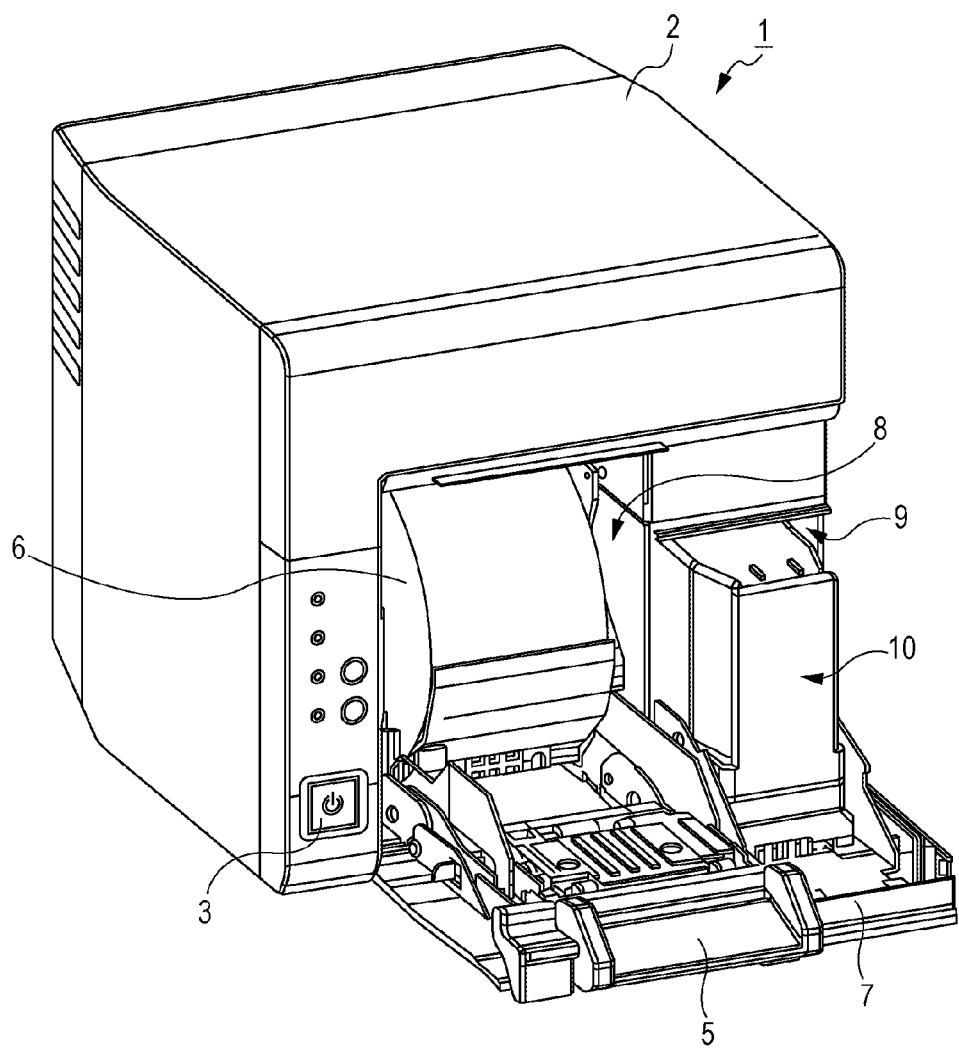
FIG. 2 is a perspective view of the entire constitution of an ink jet printer.
Figure 3:
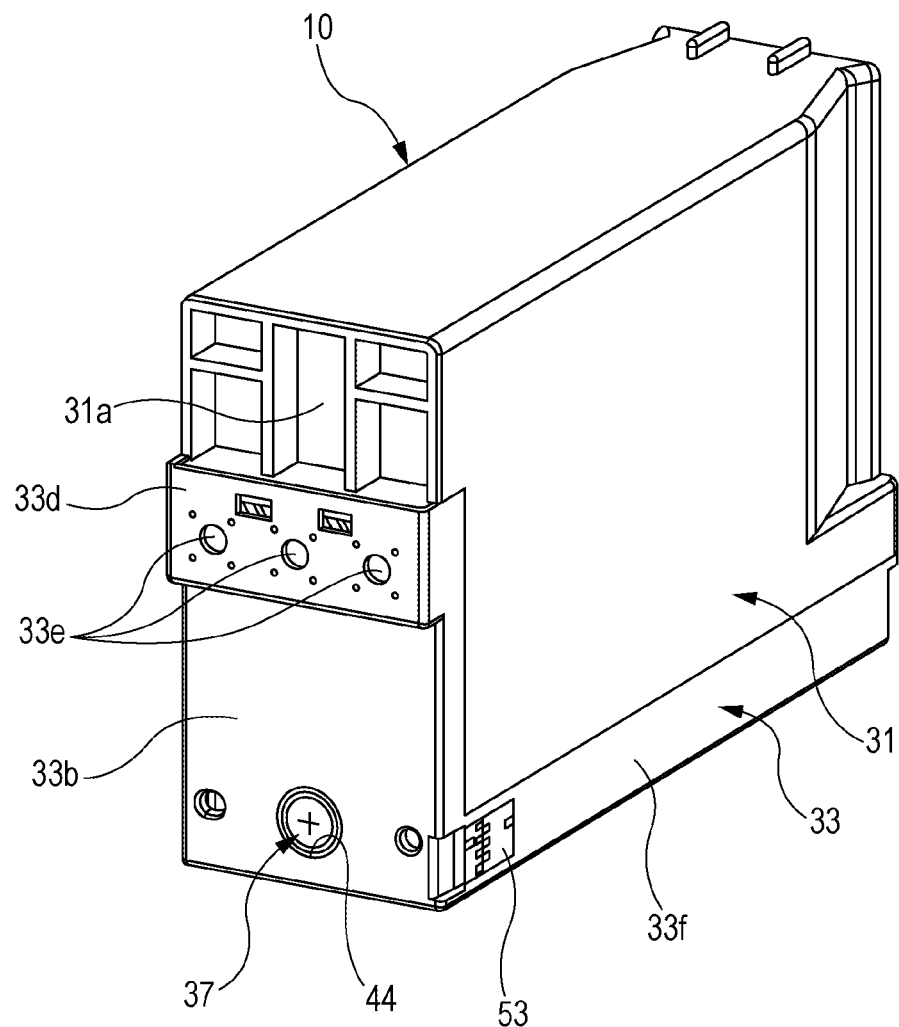
FIG. 3 is an overall perspective view of the ink cartridge of the ink jet printer illustrated in FIG. 2.
Figure 4:
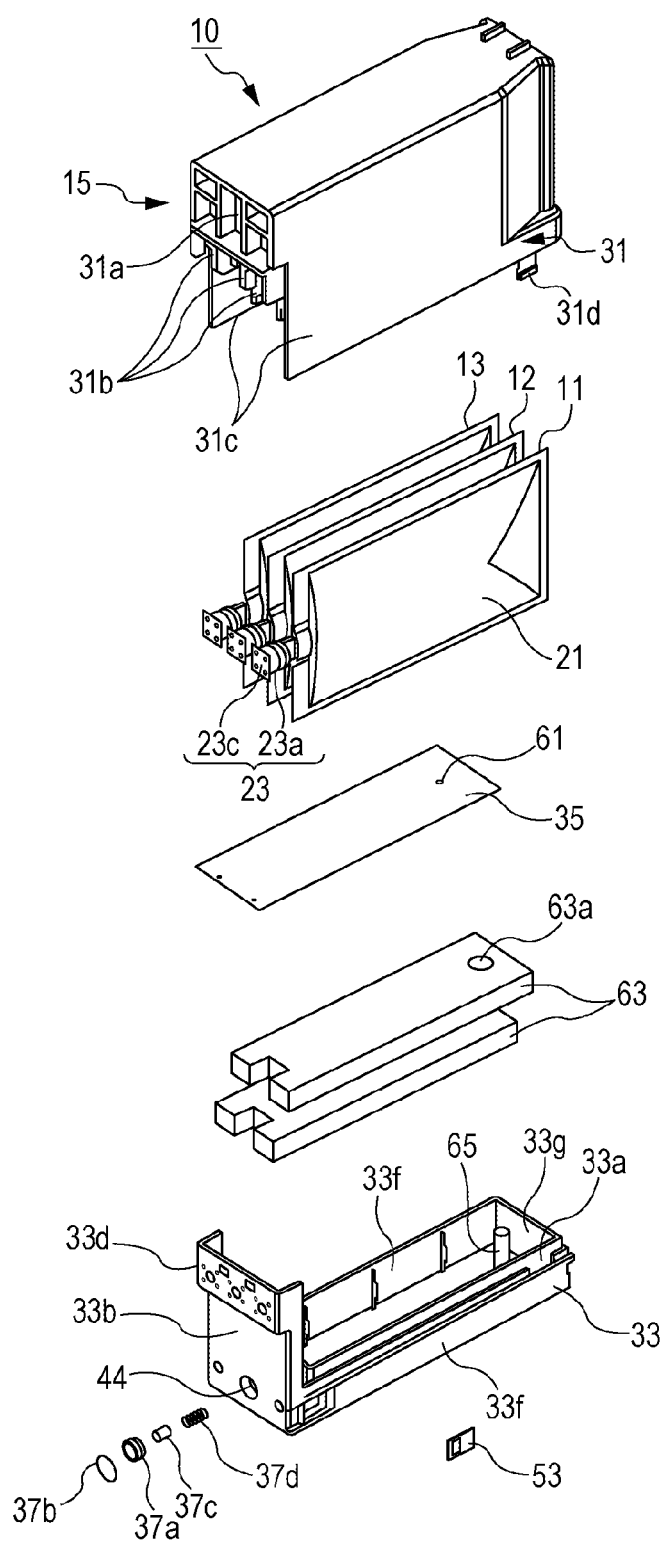
FIG. 4 is an exploded perspective view of the ink cartridge illustrated in FIG. 3.
Figure 5:
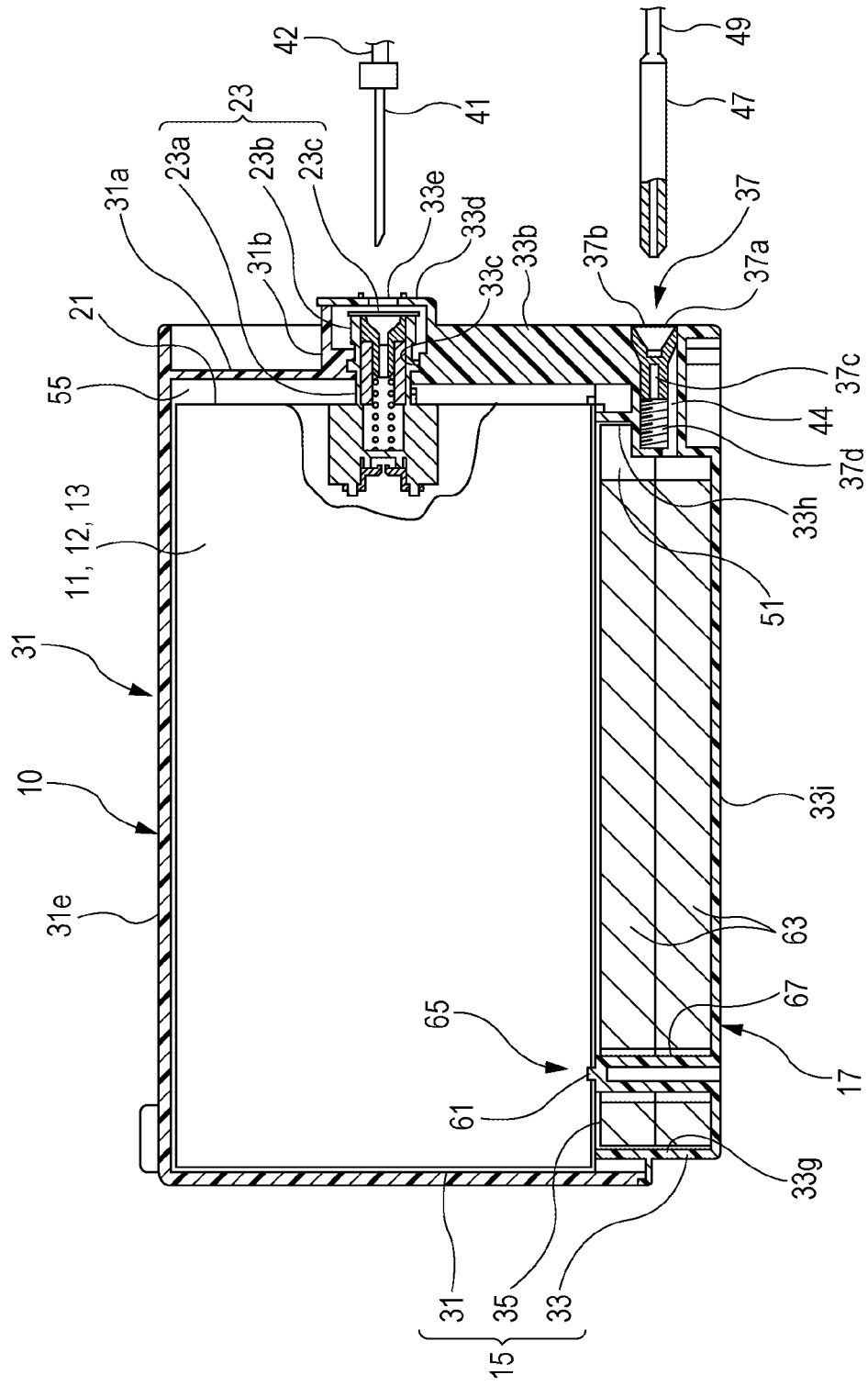
FIG. 5 is a vertical cross-sectional view of the ink cartridge illustrated in FIG. 3.
Figure 6:
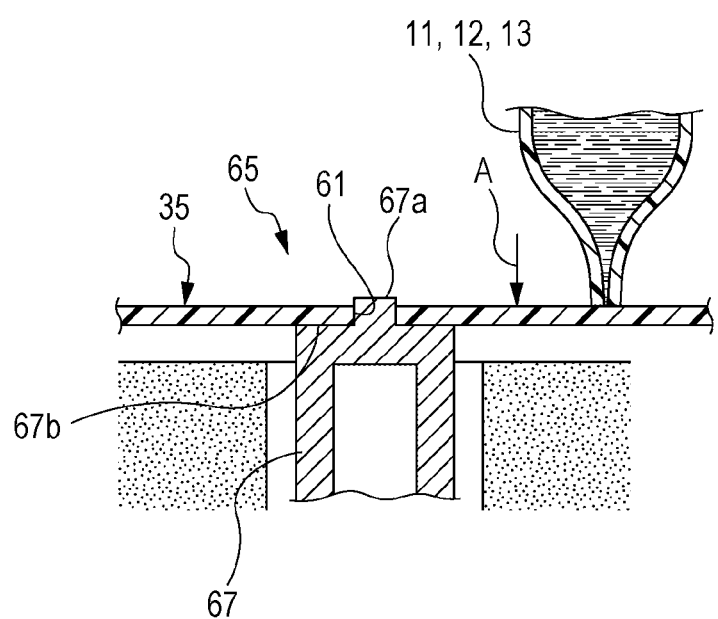
FIG. 6 is an enlarged cross-sectional diagram illustrating some essential components of the ink cartridge illustrated in FIG. 3.
Figure 7A:
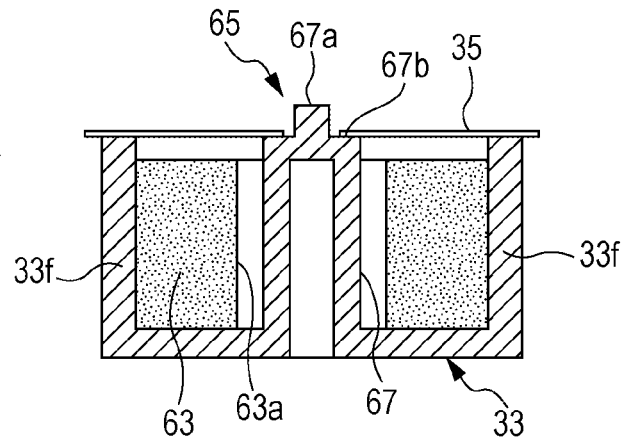
FIGS. 7A to 7C are cross-sectional diagrams illustrating the valve in FIG. 5 in the opening and closing operation.
Figure 7B:
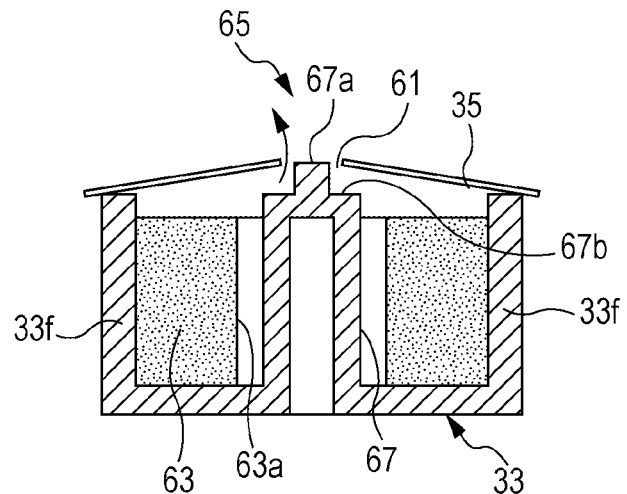
Figure 7C:
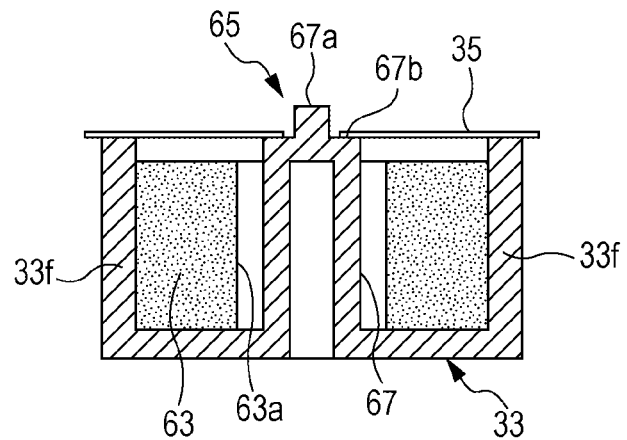

FIG. 2 is a perspective view of the entire constitution of an ink jet printer. FIG. 3 is an overall perspective view of the ink cartridge of the ink jet printer illustrated in FIG. 2. FIG. 4 is an exploded perspective view of the ink cartridge illustrated in FIG. 3. FIG. 5 is a vertical cross-sectional view of the ink cartridge illustrated in FIG. 3. FIG. 6 is an enlarged cross-sectional diagram illustrating some essential components of the ink cartridge illustrated in FIG. 3. FIGS. 7A to 7C are cross-sectional diagrams illustrating the valve in FIG. 5 in the opening and closing operation. FIG. 7A illustrates the valve in the closed position. In FIG. 7B, the valve has been opened because of the introduction of waste ink and the subsequent increase in pressure in the reservoir space. FIG. 7C illustrates the valve returned to the closed position after the introduction of waste ink.

An ink jet printer 1 produces printed matter in color on a roll of paper using a set of liquid colored inks. As illustrated in FIG. 2, the printer chassis 2 covering the main unit has covers for the paper roll and the ink cartridge, a paper roll cover 5 and an ink cartridge cover 7 each of which can be opened and closed, at the front thereof. The printer chassis 2 also has a power switch 3 and such components as a feeder switch and indicators at the front thereof.

As illustrated in FIG. 2, opening the paper roll cover 5 exposes a paper feeder 8, into which the printing paper roll 6 is loaded, thereby allowing the user to replace the paper. Likewise, opening the ink cartridge cover 7 exposes a cartridge holder 9, allowing the user to load the ink cartridge 10 into or unload it from the cartridge holder 9.

The ink jet printer 1 is so configured that the ink cartridge 10 is pulled forward a predetermined distance from the cartridge holder 9 following the ink cartridge cover 7 being opened.

As illustrated in FIGS. 3 to 5, the ink cartridge 10, which is loaded into the ink cartridge holder 9 of the ink jet printer 1, has a cartridge container 15, which contains three ink packs 11, 12, and 13 and is provided with a waste ink retaining structure 17 for retaining the waste ink generated while the printer loads ink or cleans the print head thereof.

The three ink packs 11, 12, and 13 are packed with inks of different colors for color printing. The ink packs 11, 12, and 13 have the same structure; each has a flexible bag 21 containing the ink and an ink outlet port 23 joined to the front of this bag 21.

The bag 21 is formed by joining two sheets of aluminum laminated film together at the edge thereof by means such as thermal fusion bonding. The use of aluminum laminated film improves the gas barrier properties of the bag. An example of the constitution of the aluminum laminated film is aluminum foil sandwiched between outside nylon film and inner polyethylene film.

The ink outlet port 23, as illustrated in FIG. 5, has a cylinder 23a, a valve 23b, and a sealing film 23c. The cylinder 23a has a larger outer diameter at the base than at the end and is fastened with the base thereof in the bag 21. The valve 23b is placed in this cylinder 23a and opens and closes the flow passage in the cylinder 23a. The seal film 23c is attached to the end of the cylinder 23a to seal the opening of the cylinder 23a. The cylinder 23a of the ink outlet port 23 is made of a hard plastic material, for example. The seal film 23c is a piece of polyethylene film.

The base of the cylinder 23a is fastened to the aluminum laminated film used in the bag 21 by means such as thermal fusion bonding in such a way that the ink outlet port 23 is integrated with the cylinder 23a.

The cartridge container 15, as illustrated FIGS. 4 and 5, has an upper container 31, a lower container 33, and a partition wall 35. The upper container 31 and the lower container 33 are coupled to each other with the latter below the former, and the partition wall 35 horizontally divides the space defined by the upper container 31 and the lower container 33.

The upper container 31 and the lower container 33 are made of a suitable plastic material. The partition wall 35 is made from a flexible sheet of plastic film.

The upper container 31 is a box with an open bottom. The front wall 31a is shorter than the side and rear walls. At the bottom of this front wall 31a there are hemicylindrical ink pack positioning portions 31b for positioning the upper half of the ink outlet port 23 of the ink packs 11, 12, and 13. The total number of the hemicylindrical ink pack positioning portions 31b is three so that the three stored ink packs 11, 12, and 13 can be positioned.

Each side wall 31c of the upper container 31 has a locking projection 31d in a rear position at the bottom. The locking projections 31d engage with engaging portions 33a located on the lower container 33.

The lower container 33 is a tray-like box with an open top. The front wall 33b is taller than the side and rear walls. At the top of this front wall 33b there are hemicylindrical ink pack positioning portions 33c for positioning the lower half of the ink outlet port 23 of the ink packs 11, 12, and 13.

The hemicylindrical ink pack positioning portions 33c, as illustrated in FIG. 5, hold in position the ink outlet port 23 of the ink packs 11, 12, and 13 by sandwiching the ink outlet ports 23 from above and below together with the ink pack positioning portions 31b of the upper container 31. As with the ink pack positioning portions 31b, the total number of these hemicylindrical ink pack positioning portions 33c is three so that the three stored ink packs 11, 12, and 13 can be positioned.

At the top of the front wall 33b there is a covering portion 33d, which extends from the front of the ink pack positioning portions 33c and protects the front of the ink outlet ports 23. This covering portion 33d, as illustrated in FIG. 5, has openings 33e through which ink delivery needles 41 provided to the cartridge holder 9 of the ink jet printer 1 can be inserted.

The number of the openings 33e is three, the three openings 33e individually concentric with the three hemicylindrical ink pack positioning portions 33c.

Loading the ink cartridge 10 into the cartridge holder 9 of the ink jet printer 1 brings the ink delivery needles 41 provided to the cartridge holder 9 through the ink outlet ports 23 in an airtight manner, allowing the liquid inks in the bags 21 to be delivered to the printer through the ink delivery needles 41. Each ink delivery needle 41 has been connected with a delivery tube 42 for feeding the ink to the print head of the printer.

The front wall 33b also has an inlet port 44, in which a waste ink introduction unit 37, a component of the waste ink retaining structure 17, is located.

The waste ink introduction unit 37, as illustrated in FIGS. 4 and 5, has a rubber ferrule 37a, a seal film 37b, a valve 37c, and a compressed coil spring 37d. The inside of the rubber ferrule 37a is like an inverted tapered tube; the inner diameter gets larger toward the front end. The seal film 37b is attached to the front end of this rubber ferrule 37a. The valve 37c is in contact with the rear end of the rubber ferrule 37a to block the opening of the rubber ferrule 37a. The compressed coil spring 37d urges the valve 37c against the rubber ferrule 37a.

The inlet port 44 has a projection on the edge of the opening at the leading end, and this projection locks the front end of the rubber ferrule 37a to prevent accidental disconnection. The compressed coil spring 37d, which urges the valve 37c against the rear end of the rubber ferrule 37a, pushes the rubber ferrule 37a forward to ensure that the front end of the rubber ferrule 37a should be in close contact with the projection at the leading end of the inlet port 44.

Loading the ink cartridge 10 into the cartridge holder 9 of the ink jet printer 1 makes a waste ink delivery needle 47 provided to the cartridge holder 9 plugged into the rubber ferrule 37a in an airtight manner and pushes the valve 37c, allowing the waste ink to be introduced into a reservoir space 51 through the waste ink delivery needle 47.

The waste ink delivery needle 47 has been connected with a waste ink guiding tube 49 through which the waste ink delivery needle 47 receives waste ink generated while the ink jet printer 1 loads ink or cleans the print head thereof.

On one side wall 33f of the lower container 33, as illustrated in FIGS. 3 and 4, an IC module 53 is installed that can store data such as the kind of the stored ink packs 11, 12, and 13 and the remaining amount of each ink.

Loading the ink cartridge 10 into the cartridge holder 9 of the ink jet printer 1 electrically connects this IC module 53 to a terminal provided to the cartridge holder 9. This allows the control circuitry of the printer or a computer connected with the printer to read and write information.

The partition wall 35, a wall made from plastic film (a flexible sheet) such as polyethylene film, is fastened to the lower container 33 in a slightly stretched state, with the edge thereof on the top end face of the side walls 33f, front wall 33g, and rear wall 33h of the lower container 33 and joined by means such as thermal fusion bonding.

This partition wall 35 is so fastened to the lower container 33 that the open top of the lower container 33 is covered. As a result, the reservoir space 51 is formed between the bottom wall 33i of the lower container 33 and the partition wall 35 as a component of the waste ink retaining structure 17 as illustrated in FIG. 5. Likewise, an ink pack storing space 55 is formed between the top wall 31e of the upper container 31 and the partition wall 35, allowing the three ink packs 11, 12, and 13 to be stored in an upright position as illustrated in FIG. 4.

As illustrated in FIG. 6, the ink packs 11, 12, and 13 are stored with the bottom thereof in contact with the partition wall 35, and the weight of the ink packs 11, 12, and 13 urges the partition wall 35 downward, in the direction of arrow (A) in the drawing.

The force of the ink packs 11, 12, and 13 urging the partition wall 35 downward can also act on the valve 65 of the waste ink retaining structure 17, described later herein, to hold this valve closed. This means that the partition wall 35 can also be fastened to the lower container 33 with no tension.

The waste ink retaining structure 17 in this embodiment, as illustrated in FIG. 5, has the reservoir space 51, the waste ink introduction unit 37, an air vent 61, two sheets of ink-absorbing material 63, and the valve 65. The reservoir space 51 is defined by the lower container 33 and the partition wall 35 and can retain waste ink. The waste ink introduction unit 37 introduces the waste ink into the this reservoir space 51. The air vent 61 allows the reservoir space 51 to communicate with the outside. The ink-absorbing material 63 is placed in the reservoir space 51 and absorbs the waste ink introduced from the waste ink introduction unit 37 into the reservoir space 51. The valve 65 opens and closes the air vent 61.

The waste ink introduction unit 37 for introducing waste ink into the reservoir space 51 is located in the inlet port 44 as illustrated in FIGS. 4 and 5. The inlet port 44 is on the front wall 33b, one of the walls enclosing the reservoir space 51.

As illustrated in FIG. 5, the rear end of the inlet port 44 (the left end in FIG. 5) communicates with the reservoir space 51. This allows the waste ink delivered through the waste ink delivery needle 47 inserted into the waste ink introduction unit 37 to flow into the reservoir space 51 through the rear end of the inlet port 44.

The air vent 61, formed through the partition wall 35, is a round opening through which the reservoir space 51 can communicate with the atmosphere. This air vent 61 is preferably at the point corresponding to the final destination of waste ink in the reservoir space 51. In this embodiment, the air vent 61 is away from the waste ink introduction unit 37 and close to the rear end is so located as not to interfere with the bottom of the ink packs 11, 12, and 13 as illustrated in FIG. 4.

Each sheet of the ink-absorbing material 63 is a liquid absorbent according to an embodiment of the invention and absorbs the waste ink introduced into the reservoir space 51 through the waste ink introduction unit 37 and the inlet port 44 to prevent the waste ink from flowing back to the waste ink introduction unit 37 and leaking out.

The valve 65 for the air vent 61 opens the air vent 61 and releases the air out of the reservoir space 51. This is for the purpose of facilitating the introduction of waste ink from the waste ink introduction unit 37 and thus occurs only while waste ink is introduced.

In this embodiment, the plastic film used to make the partition wall 35 having the air vent 61 is flexible enough to inflate upward in response to the pressure generated while waste ink is introduced from the waste ink introduction unit 37.

The valve 65 in this embodiment is composed of the partition wall 35, which has the air vent 61, and a valve-forming structural element 67 as illustrated in FIGS. 7A to 7C. The valve-forming structural element 67 is in the reservoir space 51, with the leading end thereof in contact with the edge of the air vent 61 to block the air vent 61.

The valve-forming structural element 67, a substantially cylindrical column, has a positioning projection 67a and a terrace 67b and is integral with the bottom wall 33i of the lower container 33, the wall facing the air vent 61. The positioning projection 67a extends from the leading end of the element through the air vent 61. The terrace 67b extends around the bottom of this positioning projection 67a is in contact with the edge of the air vent 61. The two sheets of ink-absorbing material 63 in the reservoir space 51 have a through-hole 63a through which the valve-forming structural element 67 can be inserted.

As the terrace 67b of the valve-forming structural element 67 is in contact with the air vent 61 to block the air vent 61 as illustrated in FIG. 7A, the valve 65 remains closed unless waste ink is being introduced from the waste ink introduction unit 37.

In this valve 65, the introduction of waste ink and the subsequent increase in pressure in the reservoir space 51 causes the partition wall 35 to deform and inflate upward as illustrated in FIG. 7B. As a result, the edge of the air vent 61 leaves the terrace 67b of the valve-forming structural element 67, the valve 65 opens the reservoir space 51 to the atmosphere through the air vent 61.

After the waste ink has been introduced and the pressure in the reservoir space 51 has decreased, the valve 65 closes the air vent 61 as illustrated in FIG. 7C because the tension of the partition wall 35 itself and the ink packs 11, 12, and 13 urging the partition wall 35 downward press the edge of the air vent 61 against the terrace 67b of the valve-forming structural element 67.

In this way, the waste ink retaining structure 17 in this embodiment, or more specifically the valve 65 provided therein, keeps the air vent 61 for opening the reservoir space 51 to the atmosphere closed unless waste ink is being introduced from the waste ink introduction unit 37.

As a result, the moisture in the waste ink introduced into the reservoir space 51 evaporates out through the air vent 61 only in a limited amount, the waste ink in the reservoir space 51 is prevented from solidifying, and the loss of the absorbent capacity of the ink-absorbing material 63 associated with solidified waste ink is prevented. As mentioned above, liquid absorbents according to embodiments of the invention offer excellent ink permeation (ability to absorb ink) in themselves. The synergy of these advantages allows the ink jet printer 1, in which each sheet of ink-absorbing material 63 used in the waste ink retaining structure 17 is a liquid absorbent according to an embodiment of the invention, to maintain consistent permeation and absorbent capacity for a particularly long period of time. The type of clogging caused by solidified waste ink is also effectively prevented, ensuring that the pressure in the waste ink guiding tube 49 and other waste ink delivery elements connected to the waste ink introduction unit 37 remains normal with no abnormal rise and that no ink leakage or other inconveniences occur due to events such as the detachment of the waste ink guiding tube 49.

The waste ink retaining structure 17 in this embodiment allows the user to separate the upper container 31 and the lower container 33 and remove the partition wall 35, a sheet of plastic film, from the lower container 33 when disposing of the ink cartridge 10 after use, for example. By doing this the user can see a large open area of the reservoir space 51 and easily take the ink-absorbing material 63 containing waste ink out of the reservoir space 51. This makes some operations easier; for example, it becomes easier for the user to take apart the ink cartridge 10 after use into components and separate the components by the type of material for the purpose of reuse or recycling. As mentioned above, liquid absorbents according to embodiments of the invention offer excellent ink permeation (ability to absorb ink) in themselves; these absorbents have high ink retention capacity. Each sheet of ink-absorbing material 63 used in the waste ink retaining structure 17 of the ink jet printer 1 is a liquid absorbent according to an embodiment of the invention; the user can take the ink-absorbing material 63 from the reservoir space 51 without the ingredients of the inks spilling out of the ink-absorbing material 63.

The valve 65 for opening and closing the air vent 61 can be obtained simply by forming the valve-forming structural element 67 integrally with the bottom wall 33i, which faces the air vent 61 formed through the partition wall 35 made from plastic film, with the leading end of the element in contact with the edge of the air vent 61 to block the air vent 61. No additional elements are required; this valve can be provided with no additional cost because the number of elements and the number of assembly steps do not increase.

In the ink cartridge 10 used in this embodiment the partition wall 35 having the air vent 61 separates the ink pack storing space 55 containing the ink packs 11, 12, and 13 from the reservoir space 51.

The air vent 61 is not directly exposed to the outside of the ink cartridge 10 and opens to the atmosphere always through the ink pack storing space 55 containing the ink packs 11, 12, and 13. This prevents the user from inadvertently touching the valve 65 for the air vent 61 and affecting the function of the valve.

Furthermore, the valve-forming structural element 67 in this embodiment has the positioning projection 67a, which extends from the leading end of the element through the air vent 61.

This allows easy positioning of the leading end of the valve-forming structural element 67 to match the air vent 61 in the partition wall 35, improving the ease of assembly.

Note that the ink cartridge 10 in this embodiment does not represent the only structure of an ink cartridge that can be used with this type of waste ink retaining structure. A waste ink retaining structure of this type can be used with ink cartridges different from the one described above in terms of the structure for supporting ink packs or the number of ink packs stored, for example.

Likewise, the valve-forming structural element 67 does not represent the only possible structure of a valve-forming structural element that can be used. For example, it is possible to use a valve-forming structural element in the form of a thick plate as a rib the top face of which blocks the air vent 61.

Figure 8:
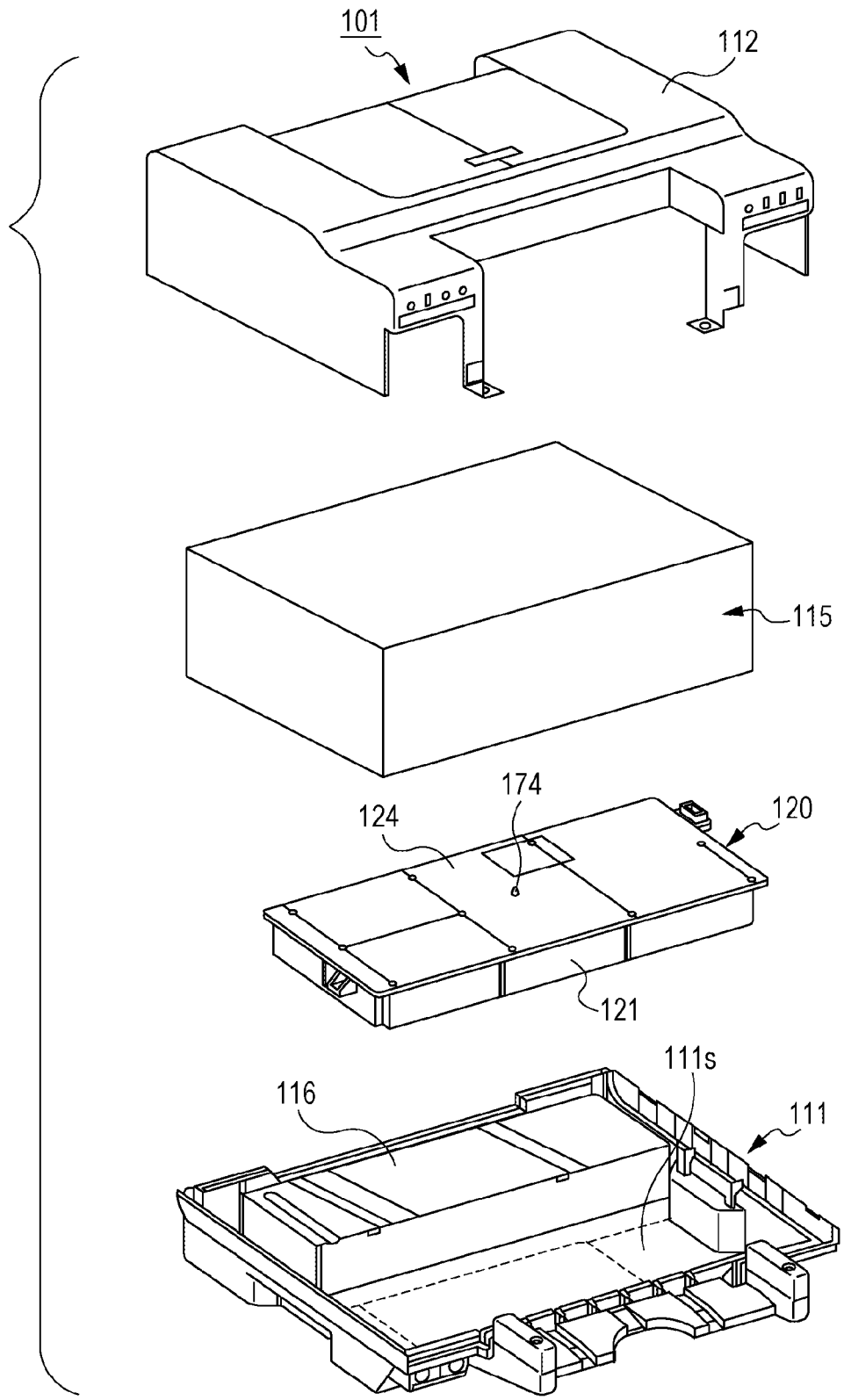
FIG. 8 is an exploded perspective view of the entire constitution of an ink jet printer.
Figure 9:
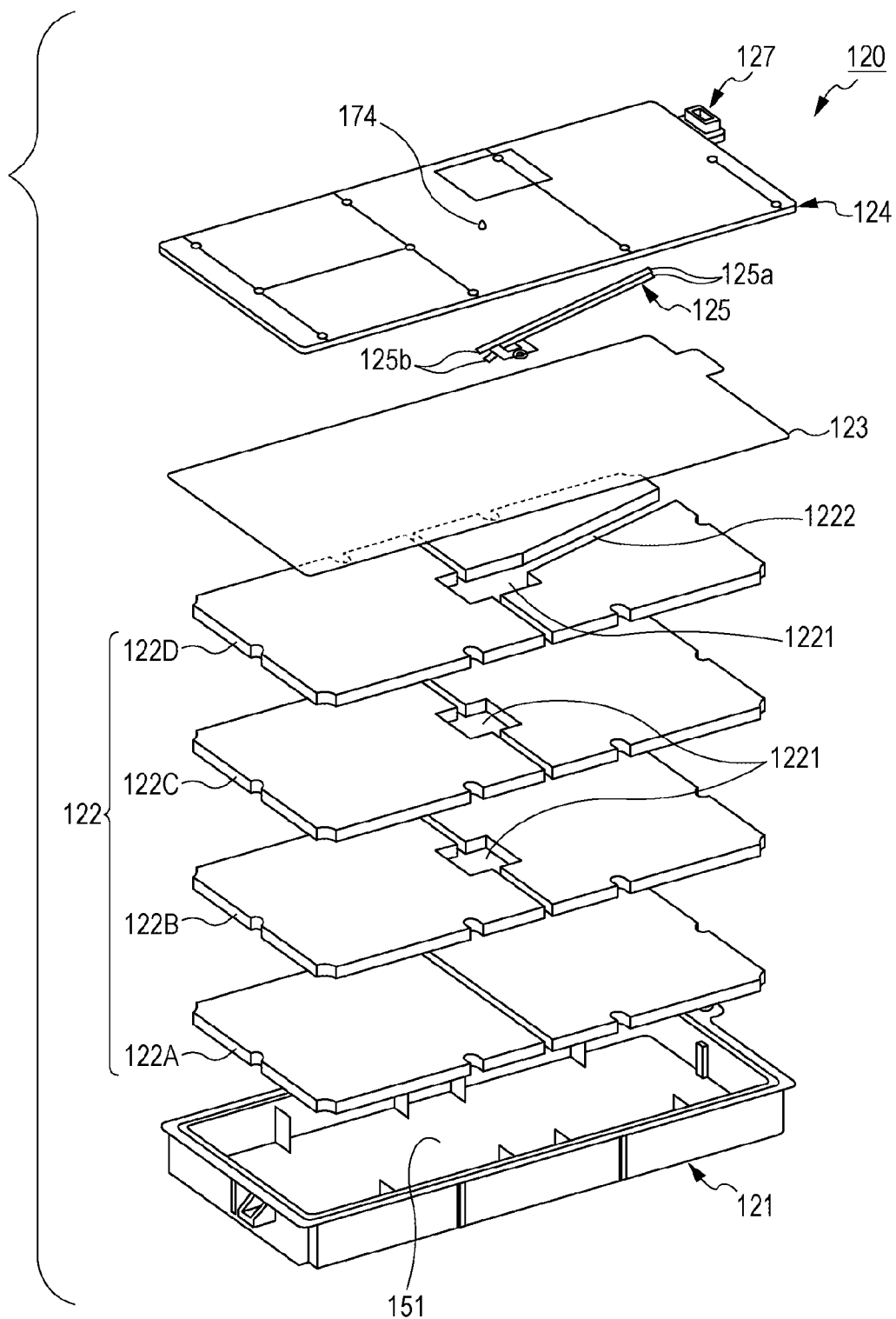
FIG. 9 is an exploded perspective view of the waste ink tank of the ink jet printer illustrated in FIG. 8.
Figure 10A:
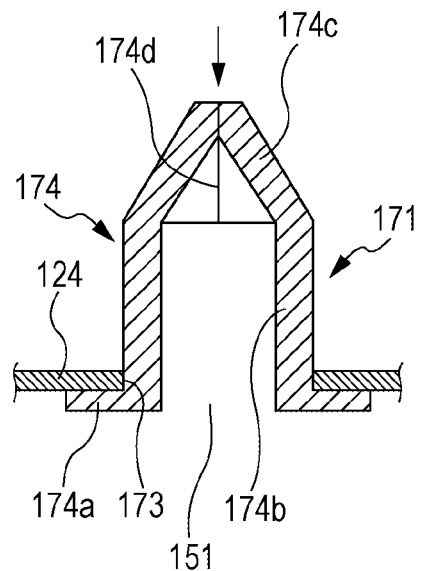
FIGS. 10A and 10B are enlarged cross-sectional views of the valve illustrated in FIG. 9.
Figure 10B:
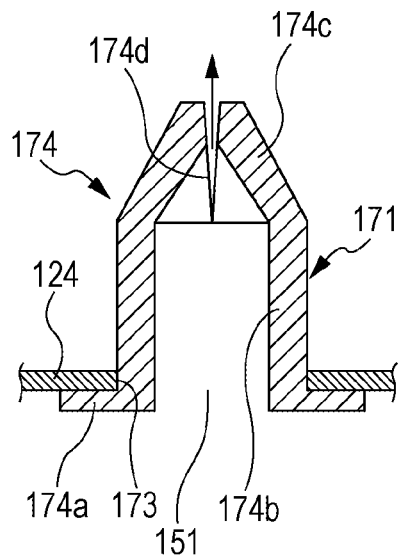
Figure 11:
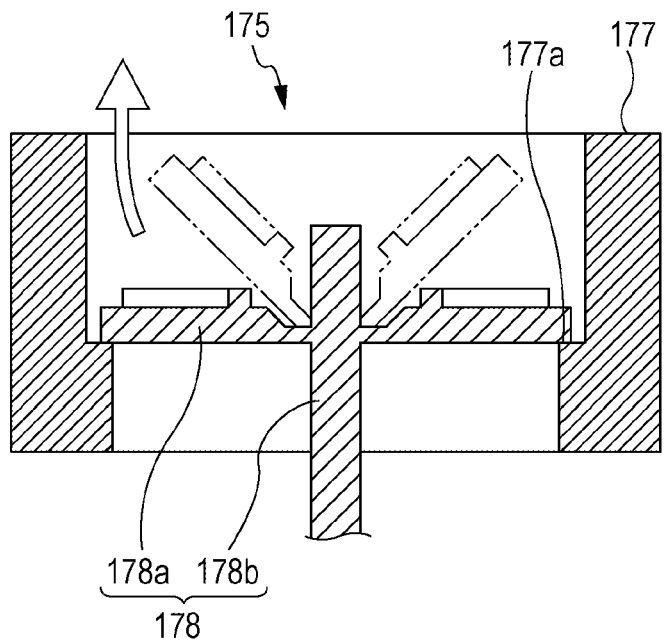
FIG. 11 is a vertical cross-sectional diagram illustrating another possible constitution of a valve unit.

FIG. 8 is an exploded perspective view of the entire constitution of an ink jet printer. FIG. 9 is an exploded perspective view of the waste ink tank of the ink jet printer illustrated in FIG. 8. FIGS. 10A and 10B are enlarged cross-sectional views of the valve illustrated in FIG. 9. FIG. 11 is a vertical cross-sectional diagram illustrating another possible constitution of a valve unit.

An ink jet printer 101 according to another embodiment of the invention, as illustrated in FIG. 8, has a printer housing 111, a waste ink tank 120, a printer mechanism unit 115, and an outer cover 112. The printer housing 111 is the lower chassis of the printer. The waste ink tank 120 is rectangular in a plan view and is detachably attached to a tank storage area 111s demarcated on the inner bottom of the housing. The printer mechanism unit 115 is placed above the printer housing 111 and the waste ink tank 120. The outer cover 112 is the upper chassis of the printer. Behind the tank storage area 111s in which the waste ink tank 120 is stored there is a power unit 116.

As illustrated in FIG. 9, the waste ink tank 120 used in this embodiment has a tray-shaped body 121 and a lid 124. The body 121 contains replaceable ink-absorbing material 122 (layers 122A, 122B, 122C, and 122D) that can absorb waste ink introduced into a reservoir space 151. The lid 124 tightly closes the open top of the body 121 with a sealant 123 such as a rubber gasket inserted. On the back of the lid 124 there is a tube 125, which guides the waste ink from an ink-receiving port 127 located at the edge of the tank to the middle of the tank and lets the waste ink fall down dropwise from above the middle of the ink-absorbing material 122. The waste ink tank 120, a plastic component, is preferably in a dark color, e.g., black.

This waste ink tank 120 can be placed in the printer housing 111 by screwing the tank onto the tank storage area 111s on the printer housing 111 and then connecting the inlet ports 125a of the tube 125 to the discharge ports of a suction pump. Reversing the procedure removes the tank independently from the printer housing 111.

The ink absorbent material 122 is a stack of several thin plates (four in the illustrated constitution), from the lowermost layer to the uppermost layer (122A, 122B, 122C, and 122D), each made from a liquid absorbent according to an embodiment of the invention. The layers other than the lowermost ink-absorbing layer 122A, i.e., the three upper ink-absorbing layers 122B, 122C, and 122D, have a vertical central hole 1221 through the middle of the plane. The uppermost ink-absorbing layer 122D also has a tube-housing groove 1222 extending from the edge to the central hole 1221.

The tube 125 is placed in the tube-housing groove 1222 of the uppermost ink-absorbing layer 122D. The inlet ports 125a of the tube 125 are positioned below the ink-receiving port 127 located at the edge of the lid 124, and the outlet ports 125b of the tube 125 are positioned above the central hole 1221 of the uppermost ink-absorbing layer 122D.

In summary, the waste ink tank 120 in this embodiment has a waste ink retaining structure composed of the lid 124, the ink-receiving port 127, and an air vent 173. The lid 124 serves as a wall for the reservoir space 151, which can retain the waste ink generated while the printer loads ink or cleans the print head thereof. The ink-receiving port 127 serves as a waste ink introduction unit for introducing the waste ink into the reservoir space 151. The air vent 173 is used to open the reservoir space 151 to the atmosphere.

The air vent 173 formed through the lid 124, as illustrated in FIGS. 10A and 10B, is plugged with a valve unit 171 that opens only while waste ink is introduced. The valve unit 171 has a valve 174 for blocking the air vent 173 formed through the lid 124. The valve 174 is an integrally formed elastic component having opening and closing sections 174c that elastically deform toward the open position in response to the pressure generated while waste ink is introduced from the ink-receiving port 127.

The valve 174 is composed of a collar 174a, a cylinder 174b, and the two or more opening and closing sections 174c, all of these components integrally formed from a rubber material. The collar 174a is closely attached to the edge of the air vent 173. The cylinder 174b extends from the inner circumference of the collar 174a through the air vent 173. At the leading end of the cylinder 174b there is a conical section like a cap, and this section is divided by an axial slit 174d to form the opening and closing sections 174c.

The opening and closing sections 174c of the valve unit 171 remain closed as in FIG. 10A while waste ink is not introduced. Once waste ink starts to be introduced, these sections elastically deform toward the open position in response to the pressure generated while the waste ink is introduced from the ink-receiving port 127 as illustrated in FIG. 10B; the slit 174d opens, allowing the air in the reservoir space 151 to escape out.

The valve unit 171 therefore requires its exclusive valve 174. However, this arrangement has some advantages; for example, providing appropriate elastic properties to the opening and closing sections 174c of the valve 174 improves the ability of the valve unit 171 to seal the air vent 173, leading to more effective prevention of the evaporation of moisture through the air vent 173.

Furthermore, the lid 124, through which the air vent 173 is formed, can be made of any material, increasing the degree of freedom in designing the waste ink tank 120 with this waste ink retaining structure.

The waste ink tank 120 used in this embodiment ensures that the moisture in the waste ink introduced into the reservoir space 151 evaporates out through the air vent 173 only in a limited amount and the waste ink in the reservoir space 151 is prevented from solidifying. As mentioned above, liquid absorbents according to embodiments of the invention offer excellent ink permeation (ability to absorb ink) in themselves. The synergy of these advantages allows the ink jet printer 101, in which each layer of ink-absorbing material 122 installed in the waste ink tank 120 is a liquid absorbent according to an embodiment of the invention, to maintain consistent absorbent capacity for a particularly long period of time.

The ink jet printer 101 according to this embodiment allows the user to remove the waste ink tank 120 independently from the printer housing 111. This means that the user can separately control the waste ink tank 120 stained with ink and reuse or recycle the clean printer housing 111 without any treatment. As the waste ink tank 120 is detachable, the user can also replace only the waste ink tank 120 with a new one, for any reason, without making his/her hands or other parts of body dirty.

Furthermore, in such cases where the waste ink tank 120 in this embodiment has been used and is to be disposed of, the user can easily disassemble the tank by opening the lid 124, taking the ink-absorbing material 122 containing waste ink out of the body 121, and then removing the valve 174, the tube 125, and other attachments from the lid 124. This makes some operations easier; for example, it becomes easier for the user to take apart the waste ink tank 120 after use into components and separate the components by the type of material for the purpose of reuse or recycling.

Note that the valve unit 171 described above does not represent the only constitution of a valve unit containing a valve having opening and closing sections that open in response to the pressure generated while waste ink is introduced from the waste ink introduction unit. Various forms of valve units are allowed.

The valve unit 175 illustrated in FIG. 11 has a seat 177 and a valve 178. The seat 177 is substantially cylindrical and is screwed into an air vent formed through a structural wall (not illustrated in the drawing), for example. The valve 178 is seated on this seat 177.

The seat 177 has a terrace 177a along the inner circumference of the cylinder to place the valve 178. The valve 178 is an integrally formed elastic component having a body 178a and a support 178b. The body 178a is like a disk and its outer circumferential portion is seated on the terrace 177a. The support 178b supports the central portion of the body 178a.

As indicated by dot-dot-dash lines in the drawing, the outer circumferential portion of the body 178a of the valve elastically deforms to leave the seat 177 in response to the increase in pressure in the reservoir space while waste ink is introduced, and the resulting opening allows the air in the reservoir space to escape out.

While the foregoing describes some preferred embodiments of the invention, the present invention is not limited to these embodiments.

For example, the production system described in the aforementioned embodiments has a feeding unit for feeding a mixture of a heat-fusible material and a flame-retardant material; however, it is possible to divide this unit into independent two for the heat-fusible material and the flame-retardant material, i.e., the production system may have separate heat-fusible material feeding and flame-retardant material feeding units. This have some advantages; for example, different kinds of liquid absorbents can be produced properly by changing the proportion of the heat-fusible material to the flame-retardant material depending on conditions such as the type of the printer in which the liquid absorbent will be used.

Printers according to embodiments of the invention may be of any kind that has a liquid absorbent according to an embodiment of the invention. The elements other than the liquid absorbent do not always have to be configured in the way described above.

Furthermore, the individual components of a printer according to an embodiment of the invention can be replaced with ones having any constitution ensuring similar operations. It is also possible to add any constructions to these components.

Embodiment 1

1. Production of Liquid Absorbents

Liquid absorbents were produced in the following way.

EXAMPLE 1

A production system of the type illustrated in FIG. 1 was prepared.

Refining

First, waste paper (the cellulose fiber source) fed from the cellulose fiber feeding unit was refined using refining equipment (in-house produced equipment) as the refining unit.

Mixing

The waste paper refined at the refining unit (cellulose fiber) was transported while a mixture of the heat-fusible material and the flame-retardant material was fed by the mixture feeding unit. A mixture of the cellulose fiber, the heat-fusible material, and the flame-retardant material was obtained in this way.

Forming

The obtained mixture was put into the mixing section of the forming unit, and the ingredients were stirred using a stirring gas.

The mixture was then placed on the transporting unit, which was made of a breathable nonwoven fabric, and sucked onto the transporting unit. By this process the mixture was brought into close contact with the transporting unit and formed into a sheet.

The sheet-shaped article was then heated and compressed (pressed) at the fixing section. The conditions were as follows: temperature, 220° C.; pressure, 4500 Pa; duration, 90 seconds.

Cutting

The pressed article was cut using an ultrasonic cutter as the cutting unit. A rectangular parallelepiped liquid absorbent was obtained in this way.

The obtained liquid absorbent was found to contain 70% cellulose fiber, 15% flame-retardant material, and 15% heat-fusible material, all in percent by mass. The flame-retardant material in the liquid absorbent was particulate aluminum hydroxide having an average particle diameter of 50 µm.

A mixed ink was obtained by mixing equal amounts (equal weights) of a black ink, a yellow ink, a magenta ink, and a cyan ink. The black ink contained, in percent by mass, 5% self-dispersing carbon black (Orient Chemical Industries CW-1; volume-weighted average particle diameter, 150 nm), 3% resin emulsion (styrene-acrylic acid), 0.5% acetylenic surfactant (OLFINE E1010), 5% glycerol, 2% 2-pyrrolidone, and 2% 1,2-hexanediol, with the balance being water. The yellow ink contained, in percent by mass, 3% resin-coated Pigment Yellow 74 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The magenta ink contained, in percent by mass, 3% resin-coated Pigment Red 122 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The cyan ink contained, in percent by mass, 3% resin-coated Pigment Blue 15:3 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The value $\sigma_1 - \sigma_0$ was 180 [µS/cm], where $\sigma_0$ [µS/cm] is the electric conductivity of the mixed ink and $\sigma_1$ [µS/cm] is that of a mixture of 5 g of the mixed ink and 1 g of the flame-retardant material in the liquid absorbent of this Example.

The resin used to coat Pigment Yellow 74, Pigment Red 122, and Pigment Blue 15:3 was a water-insoluble polymer synthesized in the following way. A reactor was loaded with 20 parts of an organic solvent (methyl ethyl ketone), 0.03 part of a chain-transfer agent (2-mercaptoethanol), 1.2 parts of a polymerization initiator (2,2'-azobis(2,4-dimethylvaleronitrile)), 20 parts of methacrylic acid, 45 parts of styrene monomer, 5 parts of polyethylene glycol monomethacrylate (9 POs), 10 parts of polyethylene glycol-propylene glycol monomethacrylate (5 EOs and 7 POs), and 20 parts of styrene macromonomer (TOAGOSEI AS-6S; number-average molecular weight, 6000; polymerizable functional group, methacryloyloxy), all in parts by mass. After the reactor was completely filled with a nitrogen gas, the monomers were polymerized at 75° C. under stirring. A solution of 0.9 part by mass of 2,2'-azobis(2,4-dimethylvaleronitrile) in 40 parts by mass of methyl ethyl ketone, both relative to 100 parts by mass of the polymerizable components, was added, and the mixture was incubated at 80° C. for 1 hour. The resulting water-insoluble polymer solution was dried under reduced pressure, leaving the water-insoluble polymer. (The terms POs and EOs denote propylene oxide units and ethylene oxide units, respectively.)

The process of coating the base pigment particles (Pigment Yellow 74, Pigment Red 122, and Pigment Blue 15:3) with the water-insoluble polymer was as follows. Five (5) parts by mass of the water-insoluble polymer was dissolved in 15 parts by mass of methyl ethyl ketone. The polymer was neutralized using an aqueous solution of sodium hydroxide, 15 parts by mass of the base pigment was added, and the mixture was kneaded in a dispersing machine while water was added. After the resulting compound was combined with 100 parts by mass of ion-exchanged water while stirring, methyl ethyl ketone and some amount of water were removed at 60° C. under reduced pressure. An aqueous dispersion of the colorant coated with the water-insoluble polymer (solid content, 20% by mass) was obtained in this way.

The process of obtaining the resin emulsion (styrene-acrylic acid) was as follows. A reactor having a stirrer, a reflux condenser, a dripping device, and a thermometer was loaded with 800 g of ion-exchanged water and 1 g of sodium lauryl sulfate, and the reactor was heated to 75° C. under stirring while nitrogen was introduced. Six (6) grams of potassium persulfate, a polymerization initiator, was added and dissolved with the internal temperature maintained at 75° C. An emulsion was prepared beforehand by combining 450 g of ion-exchanged water and 2 g of sodium lauryl sulfate with 20 g of acrylamide, 600 g of methyl methacrylate, 215 g of butyl acrylate, 30 g of methacrylic acid, and 5 g of triethylene glycol diacrylate under stirring, and this emulsion was continuously added dropwise to the reaction solution over 5 hours. The obtained mixture was incubated for 3 hours. After the resulting aqueous emulsion had cooled to room temperature, ion-exchanged water and sodium hydroxide solution were added until the solid content was 30% by mass and the pH was 8. The resin emulsion (styrene-acrylic acid) was obtained in this way.

The electric conductivity values were measured at room temperature (25° C.) using HORIBA ES-51. The heat-fusible material in the liquid absorbent was a mixture of polyester and polyethylene in the form of fiber, and its average fineness and average stable length were 1.7 dtex and 3 mm, respectively. The volume-weighted average particle diameter of the flame-retardant material was measured using HORIBA LA-910.

EXAMPLES 2 To 5 AND COMPARATIVE EXAMPLES 1 to 5

A liquid absorbent was produced as in Example 1, except that the specifications in Table 1 were followed with regard to the proportions of waste paper (cellulose fiber), the heat-fusible material, and the flame-retardant material as well as the composition of the heat-fusible and flame-retardant materials.

Table 1 summarizes the formula and other information on the liquid absorbents of the Examples and Comparative Examples.

The column "$\sigma_1-\sigma_0$" in the table indicates the value $\sigma_1-\sigma_0$ where $\sigma_0$ [μS/cm] is the electric conductivity of a mixed ink with the composition described above and $\sigma_1$ [μS/cm] is that of a mixture of 5 g of the mixed ink and 1 g of the flame-retardant material in the liquid absorbent of the Example or Comparative Example.

2. Testing

The obtained liquid absorbents were tested in the following way.

2.1 Ink Permeation (Ability to Absorb Ink)

Each of the liquid absorbents of the Examples and Comparative Examples was held with its 200-mm sides vertical and its bottom in a container filled with a pigment ink and was allowed to absorb the ink. The level of the pigment ink in the container was set at 15 mm above the bottom of the liquid absorbent.

The height from the bottom of the liquid absorbent reached by the permeating pigment ink (permeation height) was measured 2 hours later and evaluated in accordance with the criteria below. A larger penetration height means better ink permeation (ability to absorb ink). The pigment ink used in this test was a mixed ink having the composition described above.

A: The permeation height was 120 mm or more.
B: The permeation height was from 100 mm to less than 120 mm.
C: The permeation height was from 80 mm to less than 100 mm.

2.2 Burning Rate (Flame Retardancy)

The burning rate of each of the liquid absorbents of the Examples and Comparative Examples was determined as directed in JIS K6400-6. More specifically, each of the liquid absorbents of the Examples and Comparative Examples was held on one end with its 200-mm sides horizontal, the other end was exposed to a 38-mm flame for 60 seconds, and the rate at which the flame burned up the 100-mm distance between the gauge marks was determined. The determined burning rate was evaluated in accordance with the criteria below. A smaller burning rate means better flame retardancy.

TABLE 1

| | Composition of the liquid absorbent | | | | | | |
|---|---|---|---|---|---|---|---|
| | Cellulose fiber | Heat-fusible material | | Flame-retardant material | | | |
| | Amount [wt %] | Composition | Amount [wt %] | Composition | Average particle diameter [μm] | Amount [wt %] | $\sigma_1 - \sigma_0$ [μS/cm] |
| Example 1 | 70 | Polyester/polyethylene | 15 | Aluminum hydroxide | 50 | 15 | 180 |
| Example 2 | 70 | Polyester/polyethylene | 15 | Aluminum hydroxide | 8 | 15 | 210 |
| Example 3 | 75 | Polyester/polyethylene | 15 | Melamine polyphosphate | 4 | 10 | 140 |
| Example 4 | 75 | Polyester/polyethylene | 15 | Ammonium phosphate | 10 | 10 | 120 |
| Example 5 | 75 | Polyester/polyethylene | 15 | Phosphazene derivative | 80 | 10 | 200 |
| Comparative Example 1 | 75 | Polyester/polyethylene | 15 | Guanidine phosphate | 15 | 10 | 2300 |
| Comparative Example 2 | 75 | Polyester/polyethylene | 15 | Guanylurea phosphate | 15 | 10 | 2700 |
| Comparative Example 3 | 70 | Polyester/polyethylene | 15 | $Na_2B_4O_7 \cdot 10H_2O$ | 50 | 15 | 2400 |
| Comparative Example 4 | 75 | Polyester/polyethylene | 15 | Melamine polyphosphate | 12 | 10 | 550 |
| Comparative Example 5 | 70 | Polyester/polyethylene | 15 | Magnesium hydroxide | 50 | 15 | 1360 |

A: The burning rate was less than 5 mm/min.

B: The burning rate was from 5 mm/min to less than 10 mm/min.

C: The burning rate was 10 mm/min or more.

Table 2 summarizes the results of these tests.

TABLE 2

|  | Ink permeation | Flame retardancy |
|---|---|---|
| Example 1 | B | B |
| Example 2 | A | A |
| Example 3 | A | A |
| Example 4 | A | A |

TABLE 2-continued

|  | Ink permeation | Flame retardancy |
|---|---|---|
| Example 5 | B | A |
| Comparative Example 1 | D | B |
| Comparative Example 2 | D | A |
| Comparative Example 3 | D | B |
| Comparative Example 4 | C | B |
| Comparative Example 5 | D | B |

As is clear from Table 2, an embodiment of the invention provided liquid absorbents offering excellent ink permeation (ability to absorb ink) and excellent flame retardancy.

Figure 12:
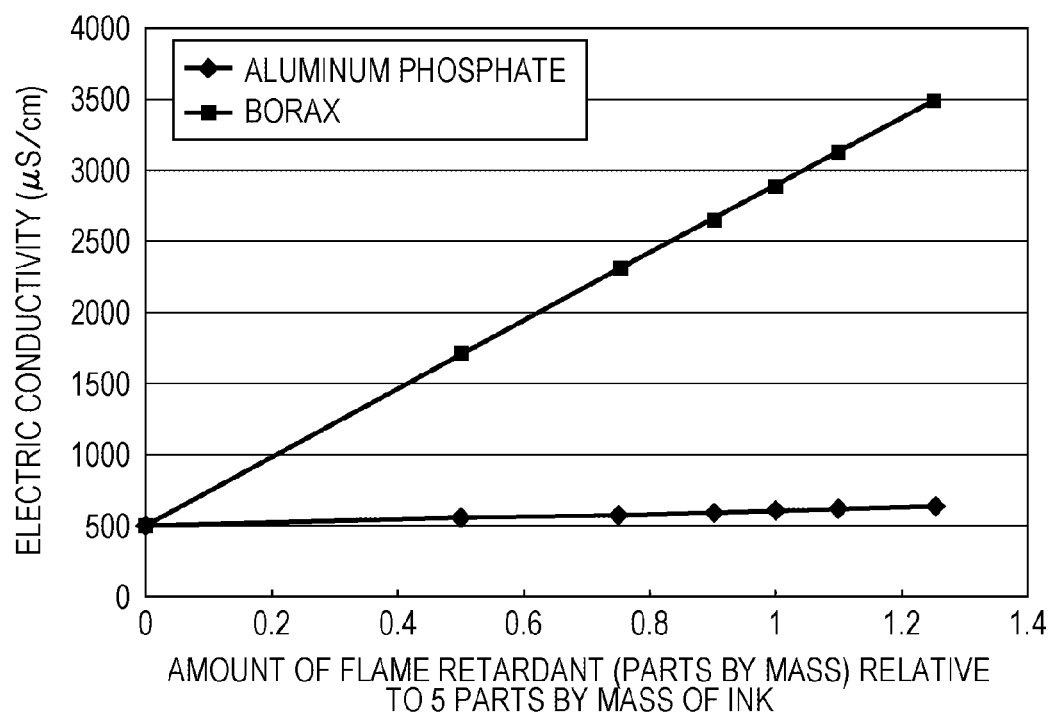
FIG. 12 is a graph showing the amount of flame retardants relative to 5 parts by mass of a mixed ink versus electric conductivity.

In mixtures of a flame retardant and a mixed ink of the type described above, the relation between the amount of the flame retardant relative to 5 parts by mass of the mixed ink and the electric conductivity is as shown in FIG. 12. The flame retardants used in this experiment were ammonium phosphate and borax ($Na_2B_4O_7 \cdot 10H_2O$).

Testing these liquid absorbents for ink permeation as in Section 2.1 with a mixed dye ink, which was a mixture of three dye inks in equal amounts (equal weights), instead of the mixed pigment ink or the mixture of four pigment inks in equal amounts (equal weights) yielded similar results. The mixed dye ink was prepared by mixing equal amounts (equal weights) of a yellow ink, a magenta ink, and a cyan ink. The yellow ink contained, in percent by mass, 0.5% C.I. Acid Yellow 23, 1.5% C.I. Direct Yellow 86, 4% triethylene glycol, and 25% glycerol, with the balance being purified water. The magenta ink contained, in percent by mass, 2% C.I. Direct Red 75, 4% triethylene glycol, and 25% glycerol, with the balance being purified water. The cyan ink contained, in percent by mass, 2% C.I. Reactive Blue 21, 4% triethylene glycol, and 25% glycerol, with the balance being purified water.

Embodiment 2

1. Production of Liquid Absorbents

Liquid absorbents were obtained by a production method similar to that for Embodiment 1 using the materials specified in Table 3.

The heat-fusible material in the liquid absorbents was a mixture of polyester and polyethylene in the form of fiber, and its average fineness and average stable length were 1.7 dtex and 3 mm, respectively. The volume-weighted average particle diameter of the flame-retardant material was measured using HORIBA LA-910.

TABLE 3

| | Composition of the liquid absorbent | | | | | |
|---|---|---|---|---|---|---|
| | Cellulose fiber | Heat-fusible material | | Flame-retardant material | | |
| | Amount [wt %] | Composition | Amount [wt %] | Composition | Average particle diameter [μm] | Amount [wt %] |
| Example 6 | 75 | Polyester/polyethylene | 15 | Melamine polyphosphate | 4 | 10 |
| Example 7 | 75 | Polyester/polyethylene | 15 | Ammonium phosphate | 10 | 10 |
| Example 8 | 75 | Polyester/polyethylene | 15 | Aluminum hydroxide | 8 | 10 |
| Comparative Example 6 | 75 | Polyester/polyethylene | 15 | Melamine polyphosphate | 15 | 10 |
| Comparative Example 7 | 75 | Polyester/polyethylene | 15 | Ammonium phosphate | 20 | 10 |
| Comparative Example 8 | 75 | Polyester/polyethylene | 15 | Aluminum hydroxide | 50 | 10 |

2. Testing

The obtained liquid absorbents were tested in the following way.

2.1 Ink Permeation (Ability to Absorb Ink)

Each of the liquid absorbents of the Examples and Comparative Examples was held with its 200-mm sides vertical and its bottom in a container filled with a pigment ink and was allowed to absorb the ink. The level of the pigment ink in the container was set at 15 mm above the bottom of the liquid absorbent.

The height from the bottom of the liquid absorbent reached by the permeating pigment ink (permeation height) was measured 2 hours later and evaluated in accordance with the criteria below. A larger penetration height means better ink permeation (ability to absorb ink). The pigment ink used in this test was a mixture of a black ink, a yellow ink, a magenta ink, and a cyan ink in equal amounts (equal weights), all four inks detailed below. The black ink contained, in percent by mass, 5% self-dispersing carbon black (Orient Chemical Industries CW-1; volume-weighted average particle diameter, 150 nm), 3% resin emulsion (styrene-acrylic acid), 0.5% acetylenic surfactant (OLFINE E1010), 5% glycerol, 2% 2-pyrrolidone, and 2% 1,2-hexanediol, with the balance being water. The yellow ink contained, in percent by mass, 3% resin-coated Pigment Yellow 74 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The magenta ink contained, in percent by mass, 3% resin-coated Pigment Red 122 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water. The cyan ink contained, in percent by mass, 3% resin-coated Pigment Blue 15:3 as a colorant, 3% resin emulsion (styrene-acrylic acid), 0.3% acetylenic surfactant (OLFINE E1010), 3% glycerol, 2% 2-pyrrolidone, and 2% 1,2-hexanediol, with the balance being water.

The resin used to coat Pigment Yellow 74, Pigment Red 122, and Pigment Blue 15:3 was a water-insoluble polymer synthesized in the following way. A reactor was loaded with 20 parts of an organic solvent (methyl ethyl ketone), 0.03 part of a chain-transfer agent (2-mercaptoethanol), 1.2 parts of a polymerization initiator (2,2'-azobis(2,4-dimethylvaleronitrile)), 20 parts of methacrylic acid, 45 parts of styrene monomer, 5 parts of polyethylene glycol monomethacrylate (9 POs), 10 parts of polyethylene glycol-propylene glycol monomethacrylate (5 EOs and 7 POs), and 20 parts of styrene macromonomer (TOAGOSEI AS-6S; number-average molecular weight, 6000; polymerizable functional group, methacryloyloxy), all in parts by mass. After the reactor was completely filled with a nitrogen gas, the monomers were polymerized at 75° C. under stirring. A solution of 0.9 part by mass of 2,2'-azobis(2,4-dimethylvaleronitrile) in 40 parts by mass of methyl ethyl ketone, both relative to 100 parts by mass of the polymerizable components, was added, and the mixture was incubated at 80° C. for 1 hour. The resulting water-insoluble polymer solution was dried under reduced pressure, leaving the water-insoluble polymer. (The terms POs and EOs denote propylene oxide units and ethylene oxide units, respectively.)

The process of coating the base pigment particles (Pigment Yellow 74, Pigment Red 122, and Pigment Blue 15:3) with the water-insoluble polymer was as follows. Five (5) parts by mass of the water-insoluble polymer was dissolved in 15 parts by mass of methyl ethyl ketone. The polymer was neutralized using an aqueous solution of sodium hydroxide, 15 parts by mass of the base pigment was added, and the mixture was kneaded in a dispersing machine while water was added. After the resulting compound was combined with 100 parts by mass of ion-exchanged water while stirring, methyl ethyl ketone and some amount of water were removed at 60° C. under reduced pressure. An aqueous dispersion of the colorant coated with the water-insoluble polymer (solid content, 20% by mass) was obtained in this way.

The process of obtaining the resin emulsion (styrene-acrylic acid) was as follows. A reactor having a stirrer, a reflux condenser, a dripping device, and a thermometer was loaded with 800 g of ion-exchanged water and 1 g of sodium lauryl sulfate, and the reactor was heated to 75° C. under stirring while nitrogen was introduced. Six (6) grams of potassium persulfate, a polymerization initiator, was added and dissolved with the internal temperature maintained at 75° C. An emulsion was prepared beforehand by combining 450 g of ion-exchanged water and 2 g of sodium lauryl sulfate with 20 g of acrylamide, 600 g of methyl methacrylate, 215 g of butyl acrylate, 30 g of methacrylic acid, and 5 g of triethylene glycol diacrylate under stirring, and this emulsion was continuously added dropwise to the reaction solution over 5 hours. The obtained mixture was incubated for 3 hours. After the resulting aqueous emulsion had cooled to room temperature, ion-exchanged water and sodium hydroxide solution were added until the solid content was 30% by mass and the pH was 8. The resin emulsion (styrene-acrylic acid) was obtained in this way.

A: The permeation height was 120 mm or more.
B: The permeation height was from 100 mm to less than 120 mm.
C: The permeation height was less than 100 mm.

2.2 Burning Rate (Flame Retardancy)

The burning rate of each of the liquid absorbents of the Examples and Comparative Examples was determined as directed in JIS K6400-6. More specifically, each of the liquid absorbents of the Examples and Comparative Examples was held on one end with its 200-mm sides horizontal, the other end was exposed to a 38-mm flame for 60 seconds, and the rate at which the flame burned up the 100-mm distance between the gauge marks was determined. The determined burning rate was evaluated in accordance with the criteria below. A smaller burning rate means better flame retardancy.

A: The burning rate was less than 5 mm/min.
B: The burning rate was from 5 mm/min to less than 10 mm/min.
C: The burning rate was 10 mm/min or more.

Table 4 summarizes the results of these tests.

TABLE 4

|  | Ink permeation | Flame retardancy |
| --- | --- | --- |
| Example 6 | A | A |
| Example 7 | A | A |
| Example 8 | A | B |
| Comparative Example 6 | C | B |
| Comparative Example 7 | C | B |
| Comparative Example 8 | B | B |

As is clear from Table 4, this embodiment also provided liquid absorbents offering excellent ink permeation (ability to absorb ink) and excellent flame retardancy.

Testing these liquid absorbents for ink permeation as in Section 2.1 with a mixed dye ink, which was a mixture of three dye inks in equal amounts (equal weights), instead of the mixed pigment ink or the mixture of four pigment inks in equal amounts (equal weights) yielded similar results. The mixed dye ink was prepared by mixing equal amounts (equal weights) of a yellow ink, a magenta ink, and a cyan ink. The yellow ink contained, in percent by mass, 0.5% C.I. Acid Yellow 23, 1.5% C.I. Direct Yellow 86, 4% triethylene glycol, and 25% glycerol, with the balance being purified water. The magenta ink contained, in percent by mass, 2% C.I. Direct Red 75, 4% triethylene glycol, and 25% glycerol, with the balance being purified water. The cyan ink contained, in percent by mass, 2% C.I. Reactive Blue 21, 4% triethylene glycol, and 25% glycerol, with the balance being purified water.

What is claimed is:

1. An ink jet printer comprising:
   a print head that prints on a paper using an ink; and
   an ink absorbent that absorbs the ink, the ink having an ink conductivity of $\sigma_0$ [μS/cm],
   wherein the ink absorbent comprises a cellulose fiber, a heat-fusible material, and a flame-retardant material; and
   the flame-retardant material satisfies a relation of $\sigma_1 - \sigma_0 \leq 500$, where $\sigma_1$ [μS/cm] is an electric conductivity of a mixture of 5 g of the ink and 1 g of the flame-retardant material.

2. The ink jet printer according to claim 1, wherein the liquid absorbent is used to absorb a pigment ink in which pigment particles are dispersed.

3. The ink jet printer according to claim 1, wherein the flame-retardant material contains one or two or more selected from the group consisting of melamine polyphosphate, ammonium phosphate, aluminum hydroxide, and phosphazenes.

4. The ink jet printer according to claim 1, wherein the cellulose fiber contains a cellulose fiber recycled from waste paper.

5. The ink jet printer according to claim 1, wherein the heat-fusible material contains one or two or more selected from the group consisting of polyesters, polyolefins, polyamides, and polyurethanes.

6. The ink jet printer according to claim 1, wherein the flame-retardant material constitutes 5% by mass to 30% by mass, both inclusive, of the liquid absorbent.

7. The ink jet printer according to claim 1, wherein the cellulose fiber constitutes 30% by mass to 90% by mass, both inclusive, of the liquid absorbent.

8. The ink jet printer according to claim 1, wherein the heat-fusible material 5% by mass to 40% by mass, both inclusive, of the liquid absorbent.

9. An ink jet printer comprising:
an ink cartridge; and
an ink absorbent positioned within the cartridge for absorbing a waste ink, the waste ink having an ink conductivity of $\sigma_0$ [μS/cm],
wherein the ink absorbent comprises a cellulose fiber, a heat-fusible material, and a flame-retardant material; and
the flame-retardant material satisfies a relation of $\sigma_1 - \sigma_0 \leq 500$, where $\sigma_1$ [μS/cm] is an electric conductivity of a mixture of 5 g of the waste ink and 1 g of the flame-retardant material.

\* \* \* \* \*